United States Patent
Watarai et al.

(10) Patent No.: US 9,631,714 B2
(45) Date of Patent: Apr. 25, 2017

(54) BICYCLE SPROCKET AND BICYCLE CRANK ASSEMBLY

(71) Applicant: SHIMANO INC., Sakai (JP)

(72) Inventors: Etsuyoshi Watarai, Sakai (JP); Kenji Kamada, Sakai (JP); Koji Yuasa, Sakai (JP)

(73) Assignee: SHIMANO INC., Sakai (JP)

( * ) Notice: Subject to any disclaimer, the term of this patent is extended or adjusted under 35 U.S.C. 154(b) by 164 days.

(21) Appl. No.: 14/667,601

(22) Filed: Mar. 24, 2015

(65) Prior Publication Data

US 2016/0280325 A1 Sep. 29, 2016

(51) Int. Cl.
*B62M 9/10* (2006.01)
*F16H 55/30* (2006.01)
*B62M 9/12* (2006.01)

(52) U.S. Cl.
CPC .............. *F16H 55/30* (2013.01); *B62M 9/105* (2013.01); *B62M 9/12* (2013.01)

(58) Field of Classification Search
CPC .......... B62M 9/10; B62M 9/105; B62M 9/12; B62M 9/00; F16H 55/30
See application file for complete search history.

(56) References Cited

U.S. PATENT DOCUMENTS

| | | | |
|---|---|---|---|
| 4,181,033 A * | 1/1980 | Nagano | B62M 9/10 474/156 |
| 5,085,620 A | 2/1992 | Nagano | |
| 6,139,456 A * | 10/2000 | Lii | B62M 9/10 474/152 |
| 8,978,514 B2 * | 3/2015 | Shiraishi | B62M 9/105 74/594.2 |
| 2004/0043855 A1 | 3/2004 | Wei | |
| 2007/0049437 A1 | 3/2007 | Wickliffe | |
| 2013/0139642 A1 | 6/2013 | Reiter et al. | |
| 2014/0013900 A1 * | 1/2014 | Shiraishi | B62M 9/105 74/594.2 |
| 2015/0226308 A1 * | 8/2015 | Pfeiffer | B62M 9/105 474/152 |

* cited by examiner

*Primary Examiner* — William E Dondero
*Assistant Examiner* — Robert T Reese
(74) *Attorney, Agent, or Firm* — Mori & Ward, LLP

(57) ABSTRACT

A bicycle sprocket comprises a sprocket body and a chain engagement structure. The chain engagement structure includes a plurality of sprocket teeth. The plurality of sprocket teeth include at least one first tooth and at least one second tooth. The at least one first tooth has a first tooth top extending non-parallel to a sprocket-plane perpendicular to a rotational center axis when viewed from a radial direction of the bicycle sprocket. The at least one first tooth has a first axial chain-engagement width that is larger than an inner link space defined between a pair of inner link plates of a bicycle chain and smaller than an outer link space defined between a pair of outer link plates of the bicycle chain. The at least one second tooth has a second axial chain-engagement width that is smaller than the inner link space.

33 Claims, 24 Drawing Sheets

FIG. 24

BICYCLE SPROCKET AND BICYCLE CRANK ASSEMBLY

BACKGROUND OF THE INVENTION

Field of the Invention

The present invention relates to a bicycle sprocket and a bicycle crank assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle sprocket.

SUMMARY OF THE INVENTION

In accordance with a first aspect of the present invention, a bicycle sprocket comprises a sprocket body and a chain engagement structure. The sprocket body has a rotational center axis, a first side and a second side opposite to the first side in an axial direction parallel to the rotational center axis. The chain engagement structure is disposed on an outer periphery of the sprocket body. The chain engagement structure includes a plurality of sprocket teeth extending radially outward from the outer periphery of the sprocket body. The plurality of sprocket teeth include at least one first tooth and at least one second tooth. The at least one first tooth has a first tooth top extending non-parallel to a sprocket-plane perpendicular to the rotational center axis when viewed from a radial direction of the bicycle sprocket. The at least one first tooth has a first axial chain-engagement width that is larger than an inner link space defined between a pair of inner link plates of a bicycle chain and smaller than an outer link space defined between a pair of outer link plates of the bicycle chain. The at least one second tooth has a second axial chain-engagement width that is smaller than the inner link space.

In accordance with a second aspect of the present invention, the bicycle sprocket according to the first aspect is configured so that the at least one first tooth including a plurality of first teeth, and the at least one second tooth including a plurality of second teeth.

In accordance with a third aspect of the present invention, the bicycle sprocket according to the first aspect is configured so that a total number of the plurality of sprocket teeth is an even number.

In accordance with a fourth aspect of the present invention, the bicycle sprocket according to the first aspect is configured so that a total number of the at least one first tooth is equal to a total number of the at least one second tooth.

In accordance with a fifth aspect of the present invention, the bicycle sprocket according to the second aspect is configured so that the plurality of second teeth are arranged alternatingly between the plurality of first teeth.

In accordance with a sixth aspect of the present invention, the bicycle sprocket according to the first aspect is configured so that the first tooth top inclines with respect to the sprocket-plane.

In accordance with a seventh aspect of the present invention, the bicycle sprocket according to the first aspect is configured so that the first tooth top has a first leading edge and a first trailing edge. The first leading edge is positioned downstream with respect to the first trailing edge in a driving-rotational direction of the bicycle sprocket. A first straight center-line is defined to connect the first leading edge with the first trailing edge and is non-parallel to the sprocket-plane.

In accordance with an eighth aspect of the present invention, the bicycle sprocket according to the seventh aspect is configured so that the at least one first tooth has a leading recess and a trailing recess. The leading recess is to avoid an excessive contact of the at least one first tooth with an inner link plate of the bicycle chain. The leading recess is at least partly provided at the first leading edge. The trailing recess is to avoid an excessive contact of the at least one first tooth with another inner link plate of the bicycle chain. The trailing recess is at least partly provided at the first trailing edge.

In accordance with a ninth aspect of the present invention, the bicycle sprocket according to the seventh aspect is configured so that the sprocket-plane is a center sprocket-plane defined to bisect the bicycle sprocket.

In accordance with a tenth aspect of the present invention, the bicycle sprocket according to the first aspect is configured so that the at least one second tooth has a second tooth top extending parallel to the sprocket-plane.

In accordance with an eleventh aspect of the present invention, the bicycle sprocket according to the second aspect is configured so that the plurality of the second teeth each has a second tooth top extending parallel to the sprocket-plane.

In accordance with a twelfth aspect of the present invention, the bicycle sprocket according to the seventh aspect is configured so that the at least one second tooth includes a plurality of second teeth. The plurality of the second teeth each has a second tooth top. The second tooth top includes a second leading edge and a second trailing edge. The second leading edge is positioned downstream from the second trailing edge with respect to the driving-rotational direction. A second straight center-line is defined to connect the second leading edge with the second trailing edge and is parallel to the center sprocket-plane.

In accordance with a thirteenth aspect of the present invention, the bicycle sprocket according to the seventh aspect is configured so that the first leading edge is positioned closer to the first side than the first trailing edge in the axial direction. The first trailing edge is positioned closer to the second side than the first leading edge.

In accordance with a fourteenth aspect of the present invention, the bicycle sprocket according to the seventh aspect is configured so that the first leading edge is positioned closer to the second side than the first trailing edge in the axial direction. The first trailing edge is positioned closer to the first side than the first leading edge.

In accordance with a fifteenth aspect of the present invention, the bicycle sprocket according to the seventh aspect is configured so that the first leading edge at least partly protrudes from a tooth bottom in the axial direction in one of the first side and the second side.

In accordance with a sixteenth aspect of the present invention, the bicycle sprocket according to the fifteenth aspect is configured so that the first trailing edge at least partly protrudes from the tooth bottom in the axial direction in the other of the first side and the second side.

In accordance with a seventeenth aspect of the present invention, the bicycle sprocket according to the seventh aspect is configured so that the first trailing edge at least partly protrudes from the tooth bottom in the axial direction in one of the first side and the second side.

In accordance with an eighteenth aspect of the present invention, the bicycle sprocket according to the ninth aspect is configured so that a first maximum leading distance defined between the first leading edge and the center sprocket-plane in the axial direction is equal to a first maximum trailing distance defined between the first trailing edge and the center sprocket-plane in the axial direction.

In accordance with a nineteenth aspect of the present invention, the bicycle sprocket according to the ninth aspect is configured so that a first maximum leading distance defined between the first leading edge and the center sprocket-plane in the axial direction is different from a first maximum trailing distance defined between the first trailing edge and the center sprocket-plane in the axial direction.

In accordance with a twentieth aspect of the present invention, the bicycle sprocket according to the nineteenth aspect is configured so that the first maximum leading distance is larger than the first maximum trailing distance.

In accordance with a twenty-first aspect of the present invention, the bicycle sprocket according to the nineteenth aspect is configured so that the first maximum leading distance is smaller than the first maximum trailing distance.

In accordance with a twenty-second aspect of the present invention, the bicycle sprocket according to the first aspect is configured so that the first side is closer to a bicycle frame than the second side in the axial direction in a state where the bicycle sprocket is mounted to the bicycle frame.

In accordance with a twenty-third aspect of the present invention, the bicycle sprocket according to the first aspect is configured so that the second side is closer to a bicycle frame than the first side in the axial direction in a state where the bicycle sprocket is mounted to the bicycle frame.

In accordance with a twenty-fourth aspect of the present invention, the bicycle sprocket according to the seventh aspect is configured so that the first straight center-line inclines with respect to the sprocket-plane.

In accordance with a twenty-fifth aspect of the present invention, the bicycle sprocket according to the ninth aspect is configured so that the at least one first tooth including a plurality of first teeth. The plurality of first teeth includes at least one third tooth and at least one fourth tooth. A third inclination angle is defined between the first straight center-line of the at least one third tooth and the center sprocket-plane on a downstream side of the driving-rotational direction and is defined at a position closer to the first side than to the second side. A fourth inclination angle is defined between the first straight center-line of the at least one fourth tooth and the center sprocket-plane on the downstream side of the driving-rotational direction and is defined at a position closer to the first side than to the second side. The third inclination angle is different from the fourth inclination angle.

In accordance with a twenty-sixth aspect of the present invention, the bicycle sprocket according to the seventh aspect is configured so that the first straight center-line is perpendicular to the sprocket-plane.

In accordance with a twenty-seventh aspect of the present invention, the bicycle sprocket according to the seventh aspect is configured so that the at least one second tooth includes a plurality of second teeth. The plurality of the second teeth each has a second tooth top. The second tooth top includes a second leading edge and a second trailing edge. The second leading edge is positioned downstream from the second trailing edge with respect to the driving-rotational direction. A second straight center-line is defined to connect the second leading edge with the second trailing edge and is non-parallel to the sprocket-plane.

In accordance with a twenty-eighth aspect of the present invention, the bicycle sprocket according to the twenty-seventh aspect is configured so that the second straight center-line inclines with respect to the sprocket-plane.

In accordance with a twenty-ninth aspect of the present invention, the bicycle sprocket according to the twenty-eighth aspect is configured so that the sprocket-plane is a center sprocket-plane defined to bisect the bicycle sprocket. A first inclination angle is defined between the first straight center-line and the center sprocket-plane on a downstream side of the driving-rotational direction and is defined at a position closer to the first side than to the second side. A second inclination angle is defined between the second straight center-line and the center sprocket-plane on the downstream side of the driving-rotational direction and is defined at a position closer to the first side than to the second side. The second inclination angle is smaller than the first inclination angle.

In accordance with a thirtieth aspect of the present invention, the bicycle sprocket according to the twenty-eighth aspect is configured so that the sprocket-plane is a center sprocket-plane defined to bisect the bicycle sprocket. A first inclination angle is defined between the first straight center-line and the center sprocket-plane on a downstream side of the driving-rotational direction and is defined at a position closer to the first side than to the second side. A second inclination angle is defined between the second straight center-line and the center sprocket-plane on the downstream side of the driving-rotational direction and is defined at a position closer to the first side than to the second side. The second inclination angle is equal to the first inclination angle. A maximum longitudinal length of the second tooth top is smaller than a maximum longitudinal length of the first tooth top when viewed from a radial direction of the bicycle sprocket.

In accordance with a thirty-first aspect of the present invention, the bicycle sprocket according to the first aspect further comprises a crank arm attachment portion.

In accordance with a thirty-second aspect of the present invention, the bicycle sprocket according to the first aspect is configured so that the at least one first tooth is adjacent to the at least one second tooth without a tooth positioned therebetween.

In accordance with a thirty-third aspect of the present invention, a bicycle crank assembly comprises the bicycle sprocket according to the first aspect.

In accordance with a thirty-fourth aspect of the present invention, the bicycle crank assembly according to the thirty-third aspect is configured so that the bicycle sprocket is a single sprocket for the bicycle crank assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 24 shows exemplary arrangements of a first tooth and a second tooth.

DESCRIPTION OF THE EMBODIMENTS

Figure 1:
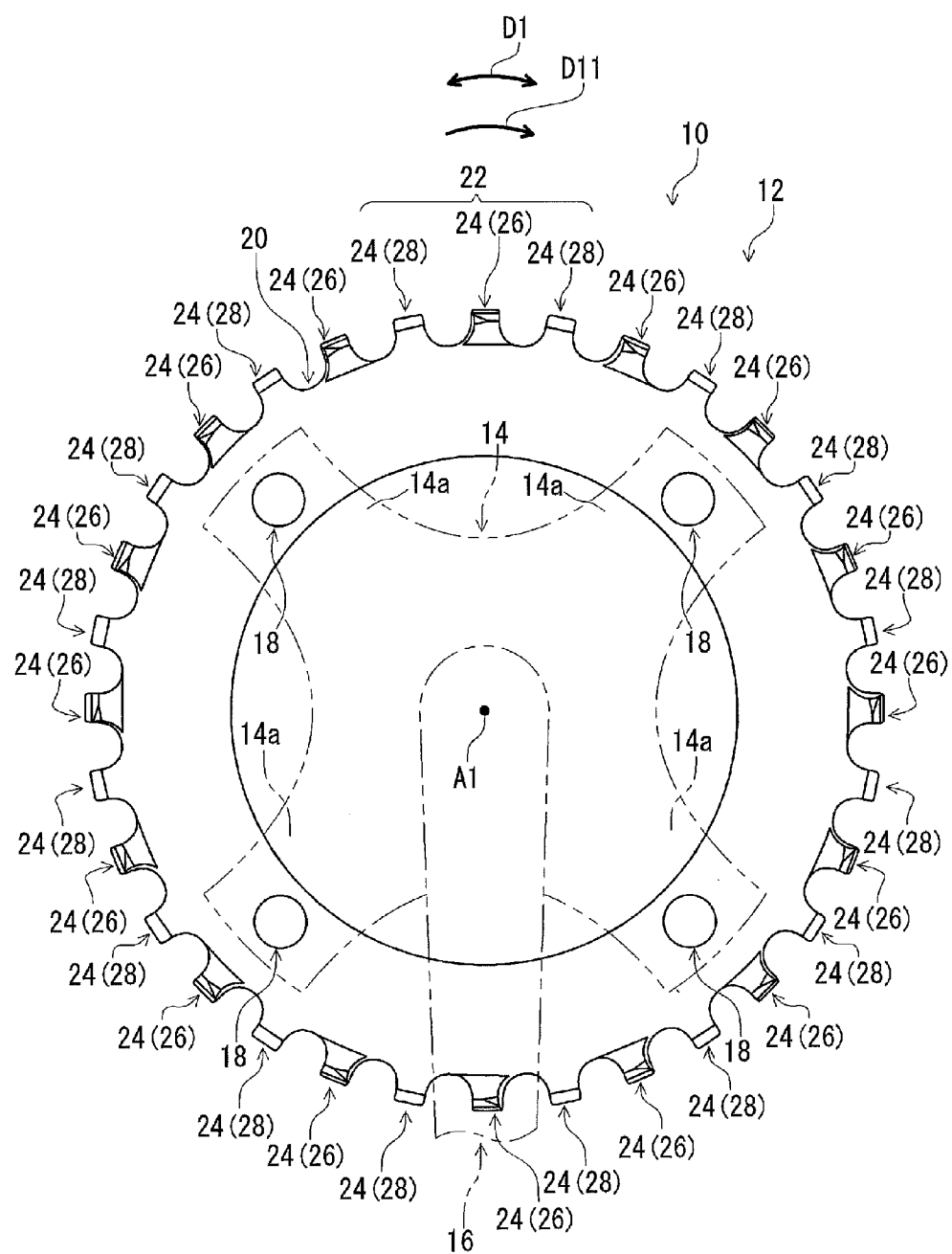
FIG. 1 is an elevational view of a bicycle crank assembly including a bicycle sprocket in accordance with a first embodiment.

The embodiments will now be described with reference to the accompanying drawings, wherein like reference numerals designate corresponding or identical elements throughout the various drawings.

First Embodiment

Figure 8:
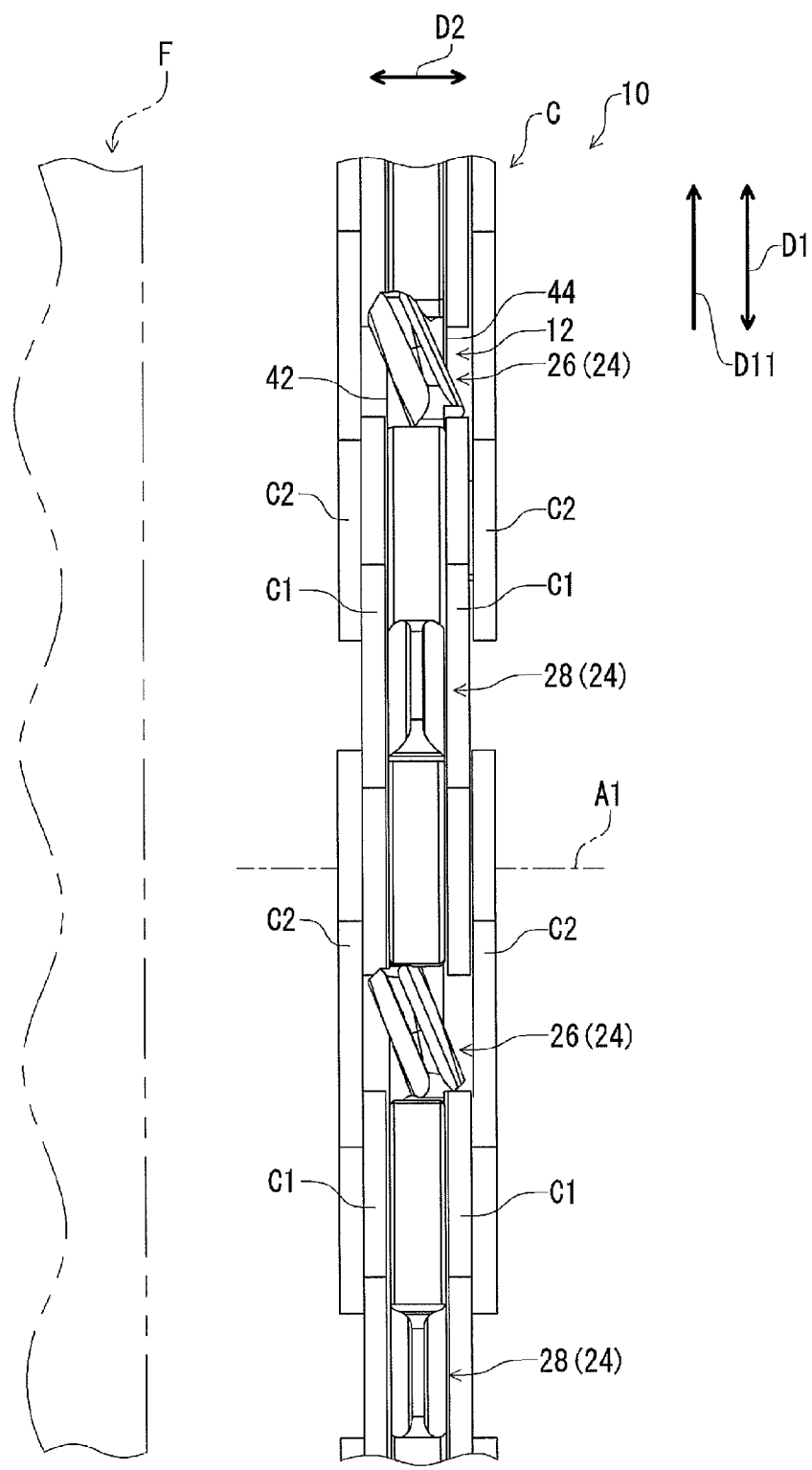
FIG. 8 is a partial plan view of the bicycle sprocket illustrated in FIG. 1 with engaging with a bicycle chain when viewed from a radial direction of the bicycle sprocket.

Referring initially to FIG. 1, a bicycle crank assembly 10 comprises a bicycle sprocket 12 in accordance with a first embodiment. The bicycle sprocket 12 is rotatable about a rotational center axis A1 relative to a bicycle frame F (FIG. 8). In the illustrated embodiment, the bicycle sprocket 12 is a single sprocket for the bicycle crank assembly 10. However, the bicycle crank assembly 10 can include a plurality of bicycle sprockets if needed and/or desired. In such an embodiment, at least one of the bicycle sprockets can have substantially the same construction as the bicycle sprocket 12. A shifting facilitation area (not shown) is provided on the bicycle sprocket 12 to facilitate shifting the bicycle chain C between the bicycle sprocket 12 and another sprocket. While the bicycle sprocket 12 is applied to the bicycle crank assembly 10, structures of the bicycle sprocket 12 can be applied to a bicycle rear sprocket assembly if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket 12 of the bicycle crank assembly 10, should be interpreted relative to the bicycle equipped with the bicycle sprocket 12 as used in an upright riding position on a horizontal surface.

As seen in FIG. 1, the bicycle crank assembly 10 includes a sprocket mounting member 14 and a crank arm 16. The sprocket mounting member 14 includes crank connecting arms 14a. The bicycle sprocket 12 further comprises a crank arm attachment portion. In the illustrated embodiment, the bicycle sprocket 12 further comprises crank arm attachment portions 18. The crank connecting arms 14a are respectively fastened to the crank arm attachment portions 18 by fasteners such as bolts (not shown). The sprocket mounting member 14 is mounted on the crank arm 16 to be rotatable integrally with the crank arm 16 about the rotational center axis A1. The sprocket mounting member 14 can also be integrally provided with the crank arm 16 as a single unitary member. Namely, the bicycle sprocket 12 is configured to be rotatable integrally with the sprocket mounting member 14 and the crank arm 16 about the rotational center axis A1. The bicycle sprocket 12 is configured to be rotated about the rotational center axis A1 in a driving-rotational direction D11 during the pedaling. The driving-rotational direction D11 is defined along a circumferential direction D1 of the bicycle sprocket 12.

As seen in FIG. 1, the bicycle sprocket 12 comprises a sprocket body 20 and a chain engagement structure 22. The sprocket body 20 has the rotational center axis A1. While the sprocket body 20 has an annular shape in the illustrated embodiment, the sprocket body 20 can have other shapes if needed and/or desired. The chain engagement structure 22 is disposed on an outer periphery of the sprocket body 20. The chain engagement structure 22 includes a plurality of sprocket teeth 24 extending radially outward from the outer periphery of the sprocket body 20. The plurality of sprocket teeth 24 are arranged in the circumferential direction D1. The plurality of sprocket teeth 24 include at least one first tooth 26 and at least one second tooth 28. The at least one first tooth 26 is adjacent to the at least one second tooth 28 without a tooth positioned therebetween.

In the illustrated embodiment, the at least one first tooth 26 includes a plurality of first teeth 26, and the at least one second tooth 28 includes a plurality of second teeth 28. A total number of the plurality of sprocket teeth 24 is an even number. A total number of the at least one first tooth 26 is equal to a total number of the at least one second tooth 28. The plurality of second teeth 28 are arranged alternatingly between the plurality of first teeth 26.

For example, the bicycle sprocket 12 includes thirty two sprocket teeth 24. The bicycle sprocket 12 includes sixteen first teeth 26 and sixteen second teeth 28. However, the total number of the plurality of sprocket teeth 24, the total number of the at least one first tooth 26, and the total number of the at least one second tooth 28 are not limited to the illustrated embodiment. The total number of the plurality of sprocket teeth 24 can be an uneven number if needed and/or desired. The total number of the at least one first tooth 26 can be different from a total number of the at least one second tooth 28 if needed and/or desired.

Furthermore, the plurality of sprocket teeth 24 can partly be omitted from the bicycle sprocket 12 if needed and/or desired. The bicycle sprocket 12 can include one first tooth 26 if needed and/or desired. The bicycle sprocket 12 can include one second tooth 28 if needed and/or desired. The first teeth 26 can partly be replaced with the second teeth 28 if needed and/or desired. The second teeth 28 can partly be replaced with the first teeth 26 if needed and/or desired. The bicycle sprocket 12 can include at least one tooth having a shape different from a shape of the first teeth 26 and a shape of the second teeth 28 if needed and/or desired.

Figure 2:
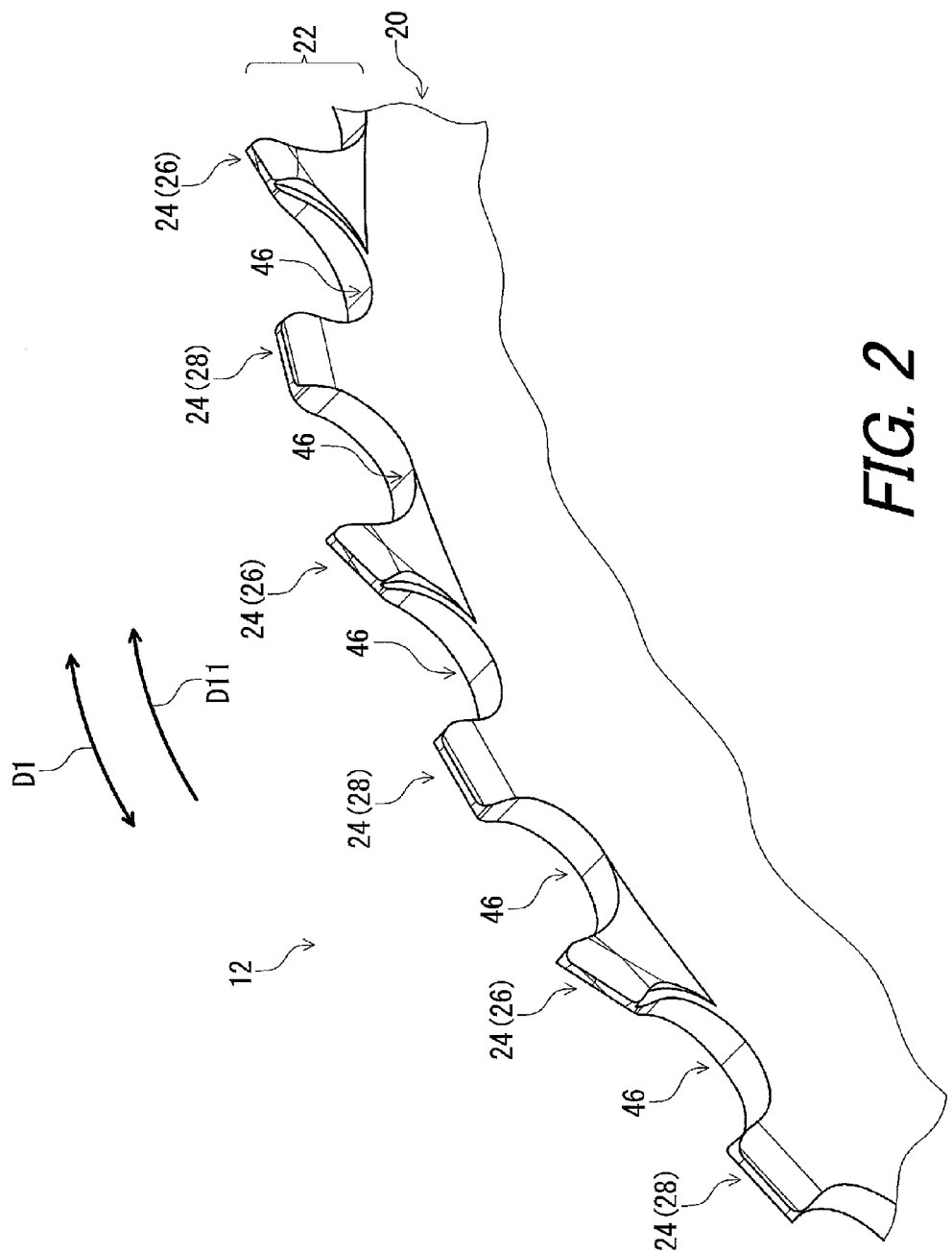
FIG. 2 is a perspective view of the bicycle sprocket illustrated in FIG. 1.
Figure 3:
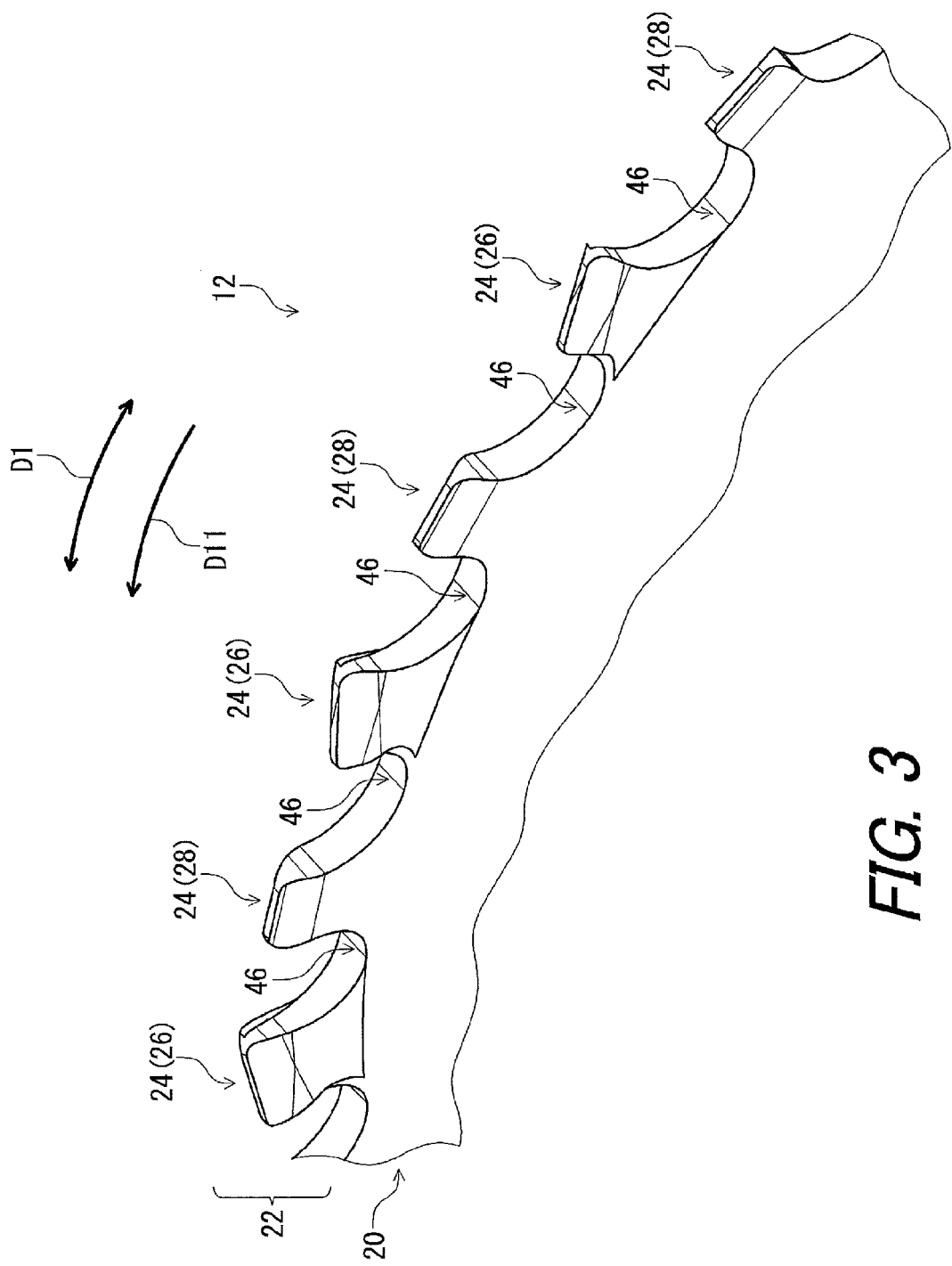
FIG. 3 is a perspective view of the bicycle sprocket illustrated in FIG. 1.

As seen in FIGS. 2 and 3, each of the plurality of second teeth 28 has a flat shape. On the other hand, each of the plurality of first teeth 26 has a twisted shape. In the illustrated embodiment, the plurality of first teeth 26 has the same shape as each other. The plurality of second teeth 28 has the same shape as each other. The plurality of first teeth 26 has the shape different from the shape of the plurality of second teeth 28. The bicycle sprocket 12 is made of a metallic material, for example. The bicycle sprocket 12 is formed with press working and punching, for example. While the bicycle sprocket 12 is integrally provided as a single unitary member in the illustrated embodiment, the bicycle sprocket 12 can include a plurality of separate members having different materials from each other if needed and/or desired.

Figure 4:
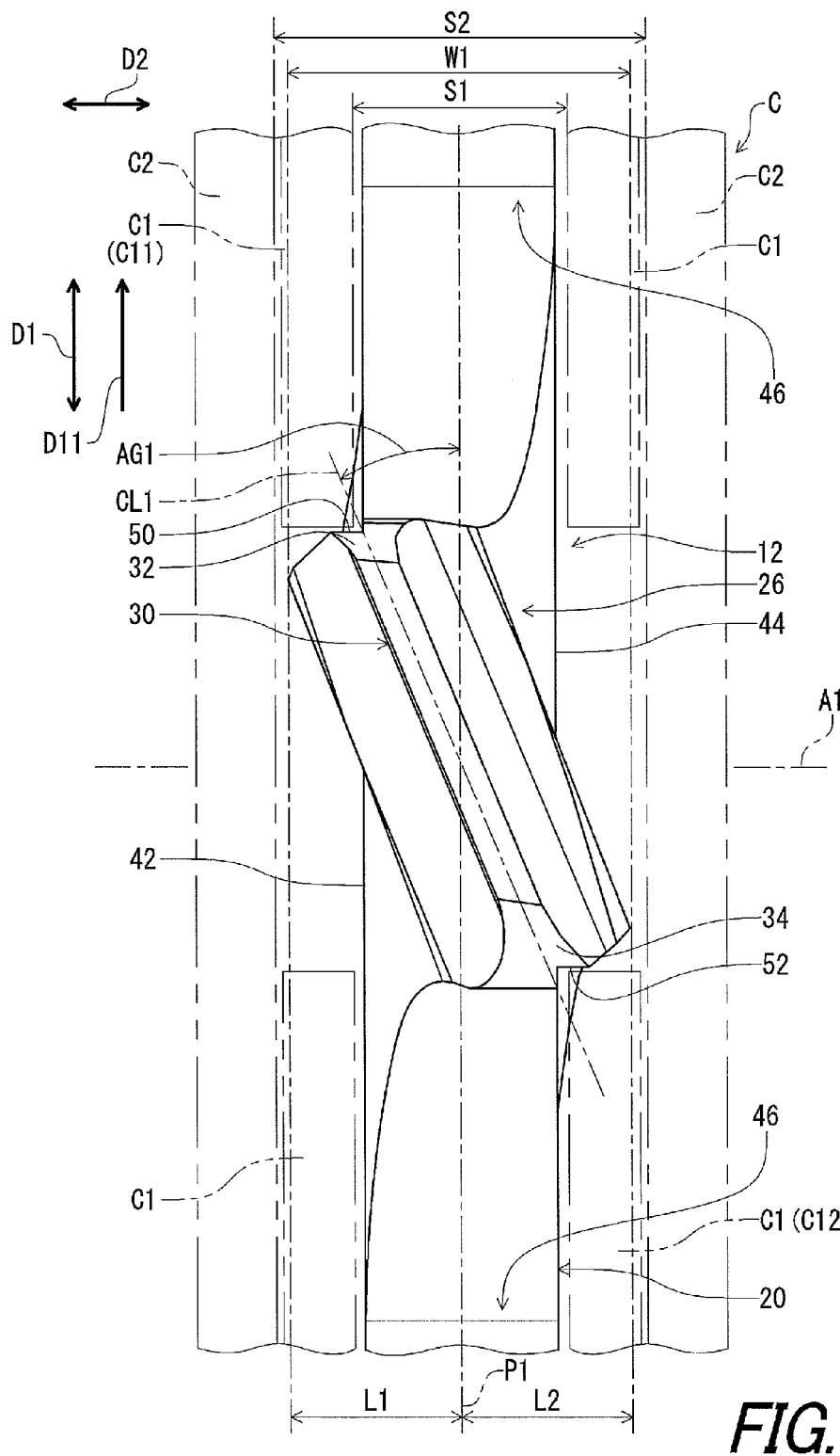
FIG. 4 is a partial plan view of a first tooth of the bicycle sprocket illustrated in FIG. 1 when viewed from a radial direction of the bicycle sprocket.

As seen in FIG. 4, the at least one first tooth 26 has a first axial chain-engagement width W1. The first axial chain-engagement width W1 is larger than an inner link space S1 defined between a pair of inner link plates C1 of a bicycle chain C and smaller than an outer link space S2 defined between a pair of outer link plates C2 of the bicycle chain C.

Figure 5:
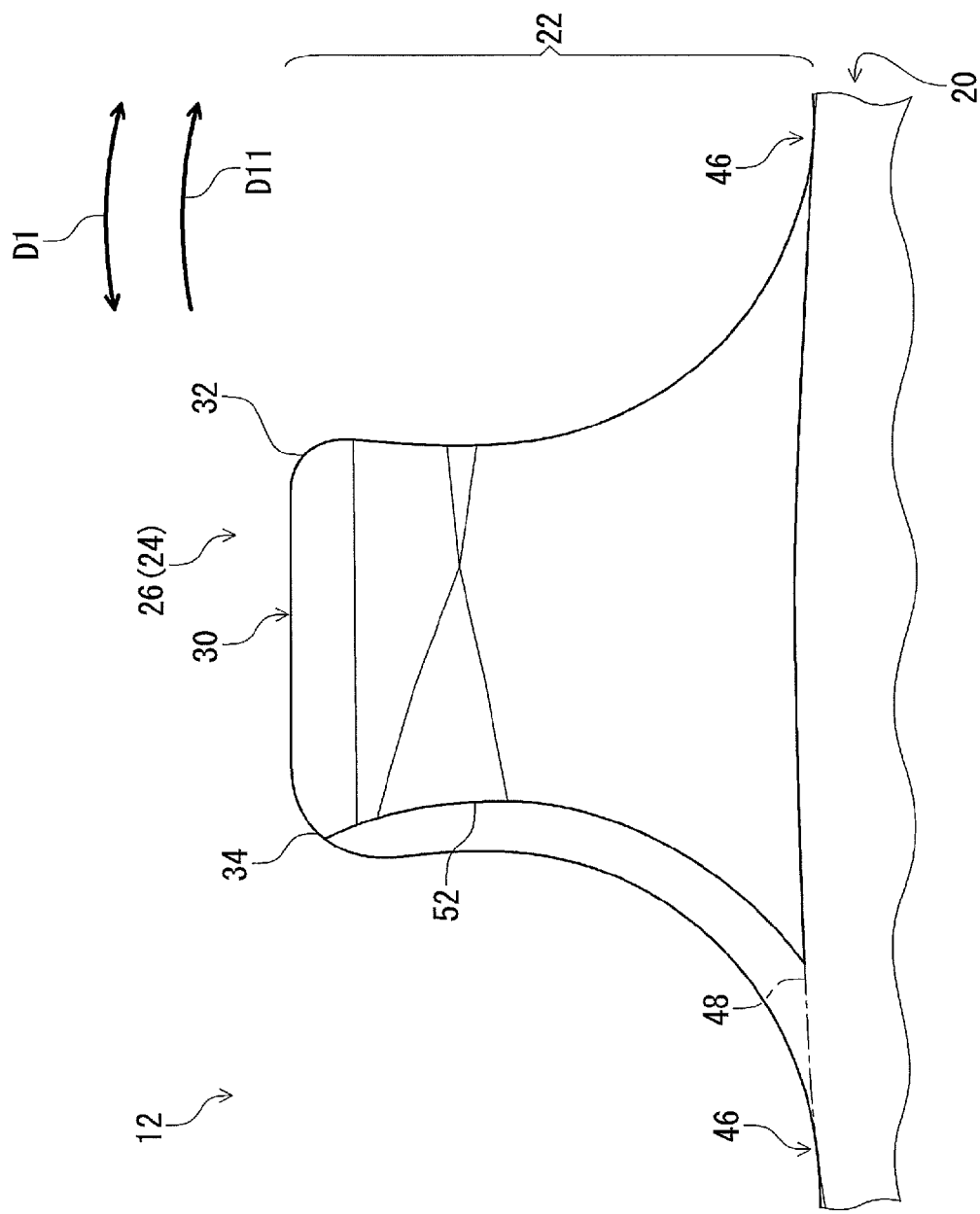
FIG. 5 is a partial elevational view of the first tooth of the bicycle sprocket illustrated in FIG. 1.

As seen in FIGS. 4 and 5, the at least one first tooth 26 has a first tooth top 30. The first tooth top 30 is provided at a radially outermost end of the first tooth 26 (FIG. 5). As seen in FIG. 4, the first tooth top 30 extends non-parallel to a sprocket-plane P1 perpendicular to the rotational center axis A1 when viewed from a radial direction of the bicycle sprocket 12. In the illustrated embodiment, the first tooth top 30 inclines with respect to the sprocket-plane P1. The sprocket-plane P1 can be a center sprocket-plane defined to bisect the bicycle sprocket 12. Thus, the sprocket-plane P1 can also be referred to as the center sprocket-plane P1.

As seen in FIG. 5, the first tooth top 30 has a first leading edge 32 and a first trailing edge 34. The first leading edge 32 is positioned downstream with respect to the first trailing edge 34 in the driving-rotational direction D11 of the bicycle sprocket 12. The first leading edge 32 has a round shape when viewed from an axial direction D2 parallel to the rotational center axis A1 (FIG. 4). The first trailing edge 34 has a round shape when viewed from the axial direction D2 (FIG. 4). The first leading edge 32 has a radius smaller than a radius of the first trailing edge 34 when viewed from the axial direction D2 (FIG. 4).

As seen in FIG. 4, a first straight center-line CL1 is defined to connect the first leading edge 32 with the first trailing edge 34 and is non-parallel to the sprocket-plane P1. The first straight center-line CL1 inclines with respect to the sprocket-plane P1. In the illustrated embodiment, the first straight center-line CL1 is defined at an axial center position of the first tooth top 30 in the axial direction D2.

Figure 6:
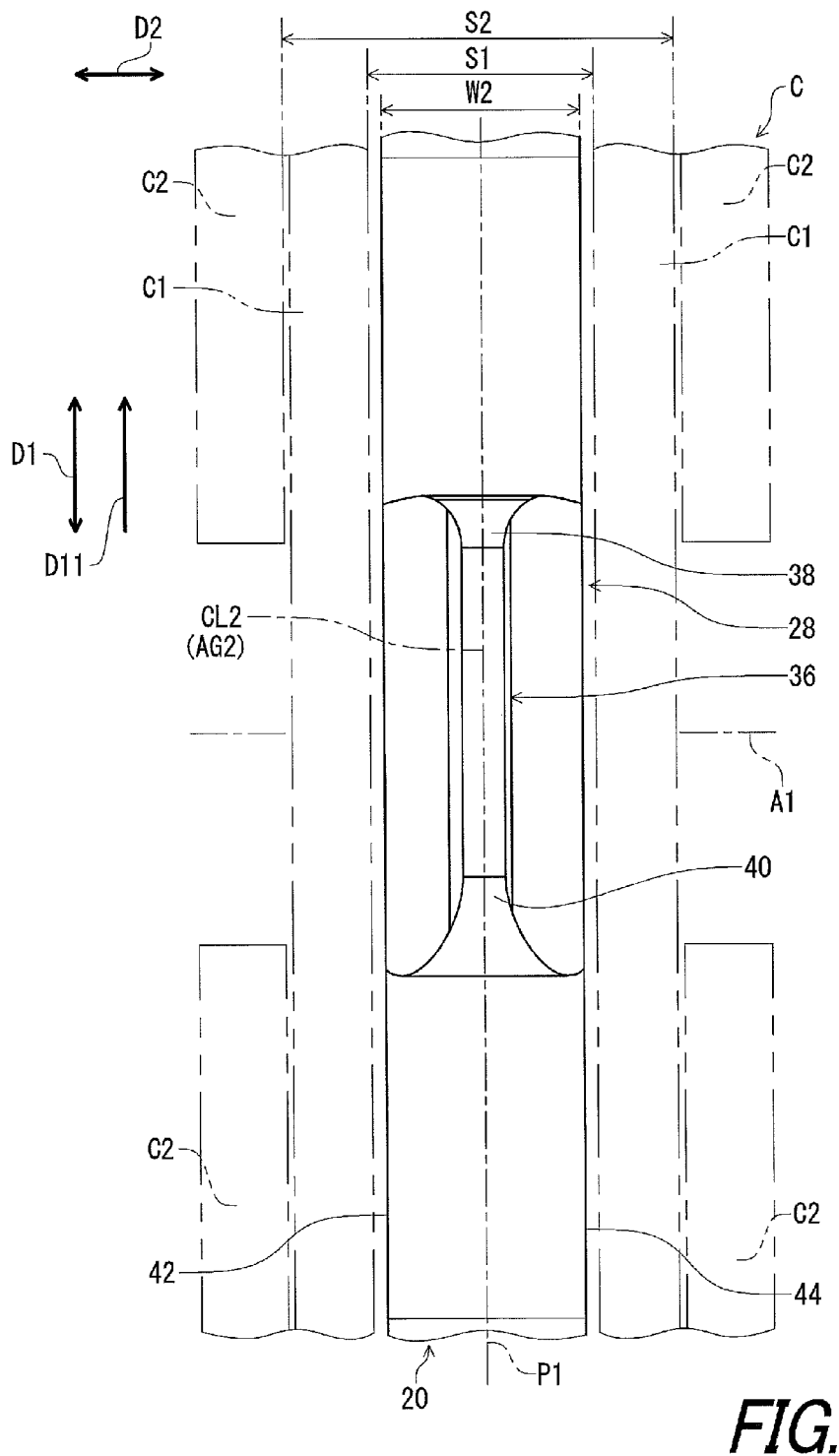
FIG. 6 is a partial plan view of a second tooth of the bicycle sprocket illustrated in FIG. 1 when viewed from a radial direction of the bicycle sprocket.

As seen in FIG. 6, the at least one second tooth 28 has a second axial chain-engagement width W2 that is smaller than the inner link space S1. The at least one second tooth 28 has a second tooth top 36 extending parallel to the sprocket-plane P1. Namely, the plurality of the second teeth 28 each has the second tooth top 36 extending parallel to the sprocket-plane P1.

Figure 7:
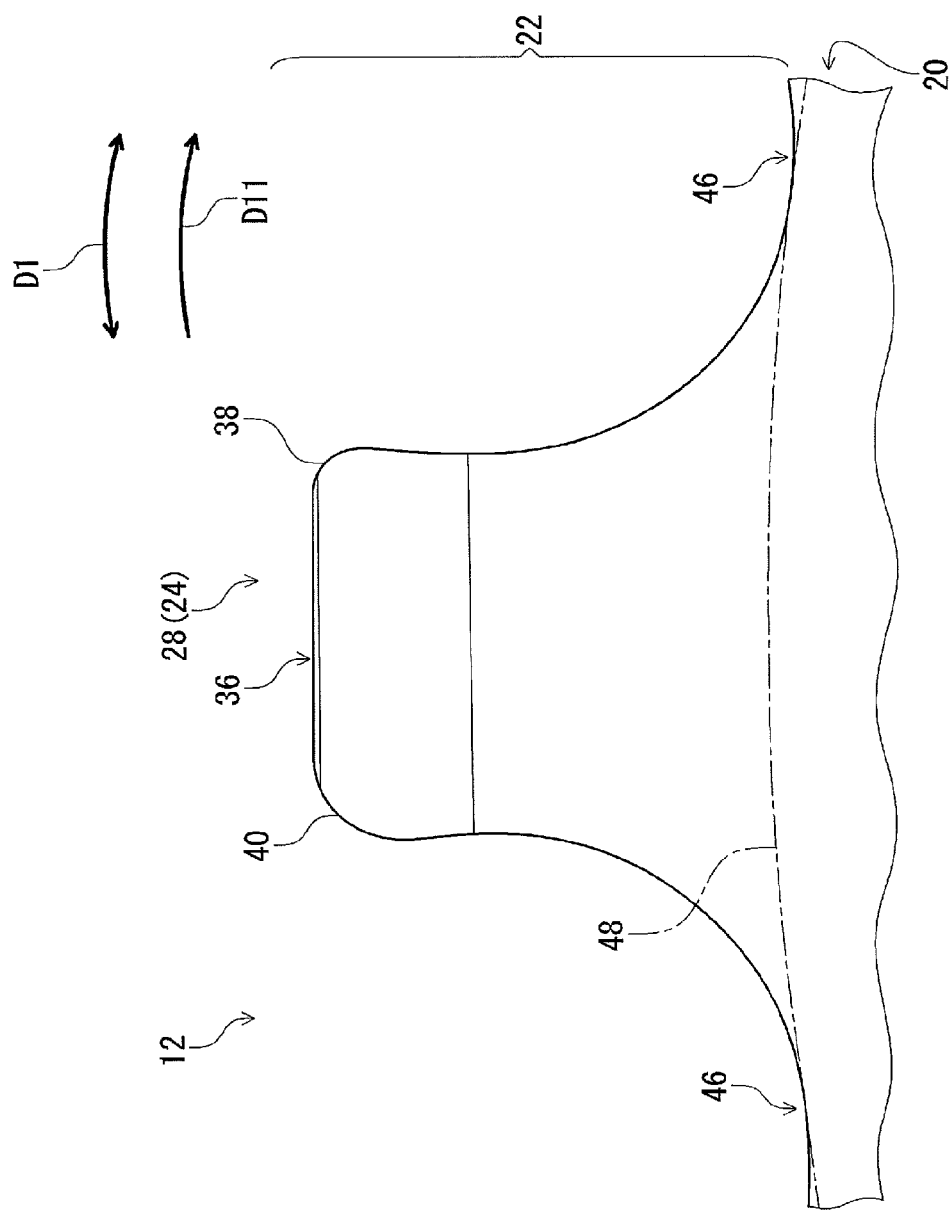
FIG. 7 is a partial elevational view of the second tooth of the bicycle sprocket illustrated in FIG. 1.

As seen in FIGS. 6 and 7, the second tooth top 36 includes a second leading edge 38 and a second trailing edge 40. The second leading edge 38 is positioned downstream from the second trailing edge 40 with respect to the driving-rotational direction D11.

As seen in FIG. 6, a second straight center-line CL2 is defined to connect the second leading edge 38 with the second trailing edge 40. In the illustrated embodiment, the second straight center-line CL2 is parallel to the center sprocket-plane P1.

As seen in FIGS. 4 and 6, the sprocket body 20 has a first side 42 and a second side 44. The second side 44 is opposite to the first side 42 in the axial direction D2 parallel to the rotational center axis A1. In the illustrated embodiment, the sprocket-plane P1 is a center sprocket-plane defined to bisect the bicycle sprocket 12. Specifically, the center sprocket-plane P1 is defined at an axial center position between the first side 42 and the second side 44 in the axial direction D2. As seen in FIG. 6, the second straight center-line CL2 is defined on the center sprocket-plane P1.

In the illustrated embodiment, as seen in FIG. 8, the first side 42 is closer to the bicycle frame F than the second side 44 in the axial direction D2 in a state where the bicycle sprocket 12 is mounted to the bicycle frame F. However, the second side 44 can be closer to the bicycle frame F than the first side 42 in the axial direction D2 in the state where the bicycle sprocket 12 is mounted to the bicycle frame F if needed and/or desired.

As seen in FIG. 4, the first leading edge 32 is positioned closer to the first side 42 than the first trailing edge 34 in the axial direction D2. The first trailing edge 34 is positioned closer to the second side 44 than the first leading edge 32. A first inclination angle AG1 is defined between the first straight center-line CL1 and the center sprocket-plane P1 on a downstream side of the driving-rotational direction D11. The first inclination angle AG1 is defined at a position closer to the first side 42 than to the second side 44. In the illustrated embodiment, the first inclination angle AG1 is an acute angle.

As seen in FIG. 6, a second inclination angle AG2 is defined between the second straight center-line CL2 and the center sprocket-plane P1 on the downstream side of the driving-rotational direction D11. The second inclination angle AG2 is defined at a position closer to the first side 42 than to the second side 44. In the illustrated embodiment, the second inclination angle AG2 is zero since the second straight center-line CL2 is parallel to the center sprocket-plane P1. Thus, as seen in FIGS. 4 and 6, the second inclination angle AG2 is smaller than the first inclination angle AG1.

As seen in FIG. 4, the first leading edge 32 at least partly protrudes from a tooth bottom 46 in the axial direction D2 in one of the first side 42 and the second side 44. The first trailing edge 34 at least partly protrudes from the tooth bottom 46 in the axial direction D2 in the other of the first side 42 and the second side 44. In the illustrated embodiment, the first leading edge 32 partly protrudes from the tooth bottom 46 in the axial direction D2 in the first side 42. The first trailing edge 34 partly protrudes from the tooth bottom 46 in the axial direction D2 in the second side 44. The first leading edge 32 can entirely protrude from the tooth bottom 46 in the axial direction D2 in the first side 42 if needed and/or desired. The first trailing edge 34 can entirely protrude from the tooth bottom 46 in the axial direction D2 in the second side 44 if needed and/or desired.

As seen in FIGS. 2 and 3, the bicycle sprocket 12 includes tooth bottoms 46. Each of the tooth bottoms 46 is provided between the first tooth 26 and the second tooth 28. As seen in FIGS. 5 and 7, the tooth bottoms 46 define a root circle 48 of the bicycle sprocket 12.

As seen in FIG. 4, a first maximum leading distance L1 defined between the first leading edge 32 and the center sprocket-plane P1 in the axial direction D2 is equal to a first maximum trailing distance L2 defined between the first trailing edge 34 and the center sprocket-plane P1 in the axial direction D2. However, the first maximum leading distance L1 can be different from the first maximum trailing distance L2 if needed and/or desired.

Figure 9:
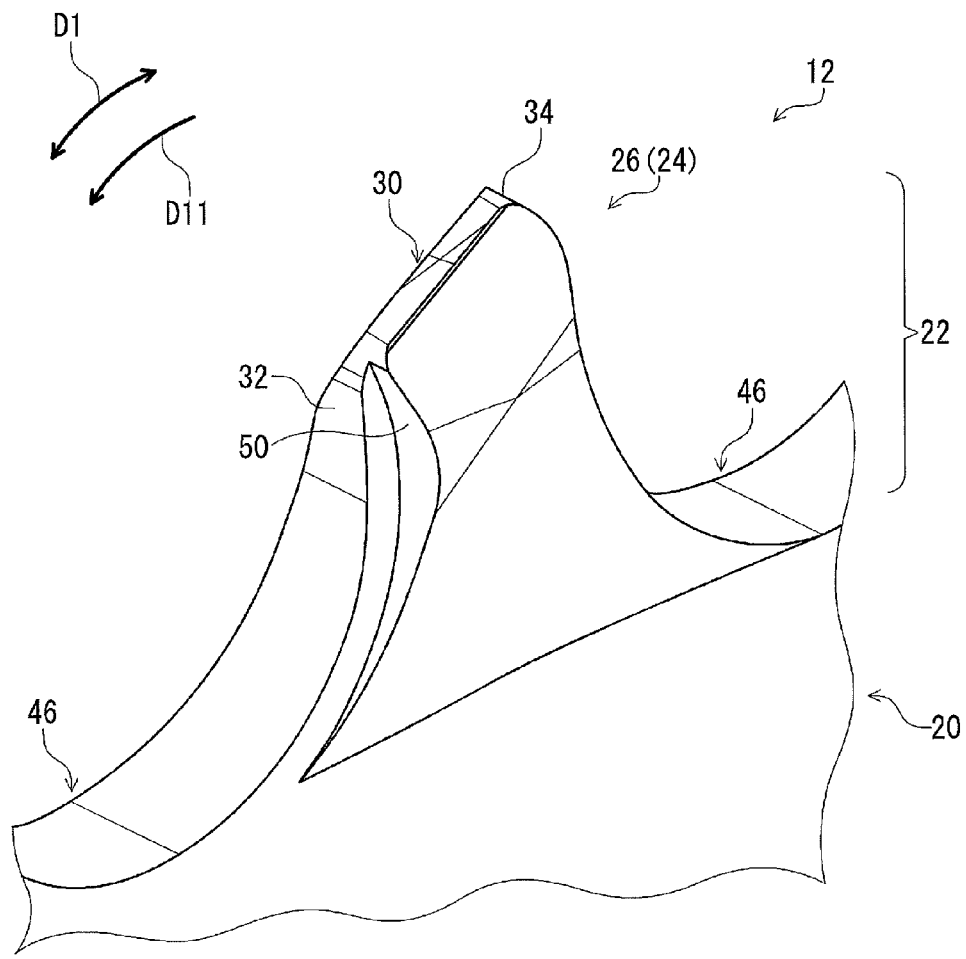
FIG. 9 is a partial perspective view of the first tooth of the bicycle sprocket illustrated in FIG. 1.

As seen in FIGS. 4 and 9, the at least one first tooth 26 has a leading recess 50 to avoid an excessive contact of the at least one first tooth 26 with an inner link plate C11 (FIG. 4) of the bicycle chain C. The leading recess 50 is at least partly provided at the first leading edge 32. In the illustrated embodiment, as seen in FIG. 9, the leading recess 50 extends from the first leading edge 30 toward the tooth bottom 46. The leading recess 50 can be omitted from the first tooth 26 if needed and/or desired.

Figure 10:
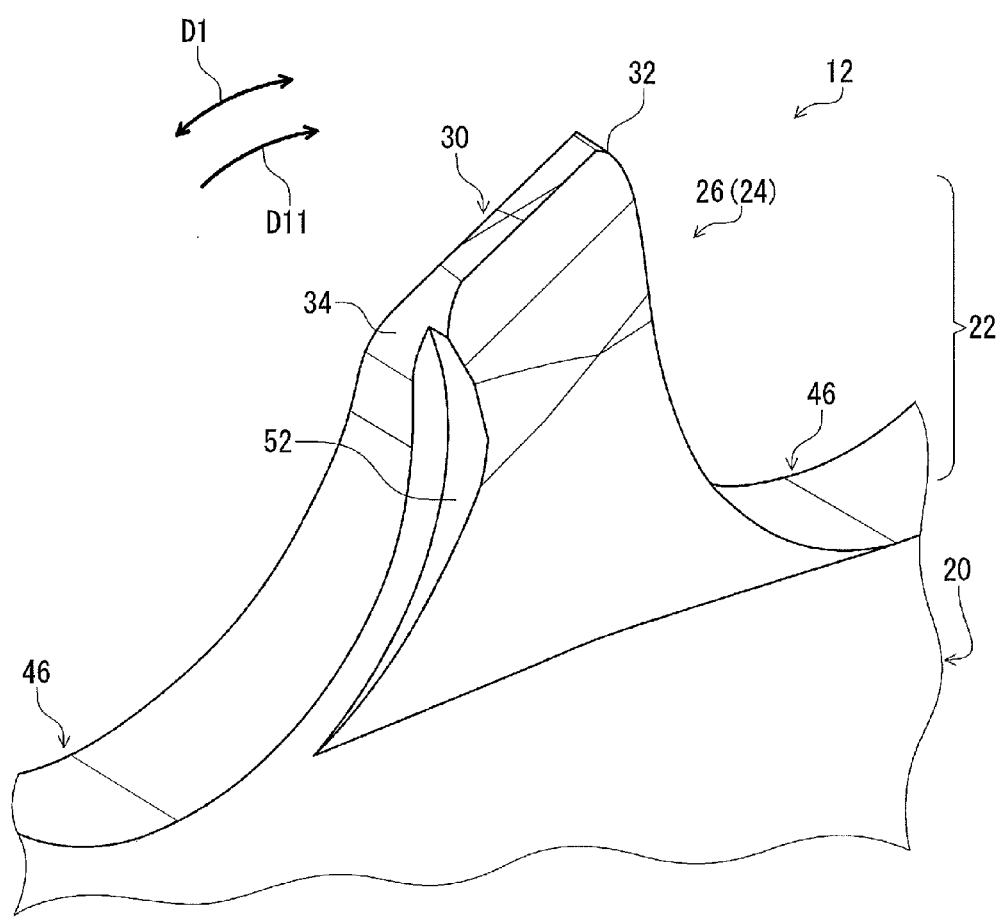
FIG. 10 is a partial perspective view of the first tooth of the bicycle sprocket illustrated in FIG. 1.

As seen in FIGS. 4 and 10, the at least one first tooth 26 has a trailing recess 52 to avoid an excessive contact of the at least one first tooth 26 with another inner link plate C12 (FIG. 4) of the bicycle chain C. The trailing recess 52 is at least partly provided at the first trailing edge 32. In the illustrated embodiment, as seen in FIG. 10, the trailing recess 52 extends from the first trailing edge 32 toward the tooth bottom 46. The trailing recess 52 can be omitted from the first tooth 26 if needed and/or desired.

With the bicycle sprocket 12, as seen in FIG. 4, the first tooth top 30 extends non-parallel to the sprocket-plane P1 perpendicular to the rotational center axis A1 when viewed from the radial direction of the bicycle sprocket 12. The at least one first tooth 26 has the first axial chain-engagement width W1. The first axial chain-engagement width W1 is larger than the inner link space S1 defined between the pair of inner link plates C1 of the bicycle chain C and smaller than the outer link space S2 defined between the pair of outer link plates C2 of the bicycle chain C. The at least one second tooth 28 has the second axial chain-engagement width W2 that is smaller than the inner link space S1. Accordingly, it is possible to improve the function to hold the bicycle chain C in the bicycle sprocket 12 while the structure of the bicycle sprocket 12 keeps simple.

Second Embodiment

A bicycle crank assembly 210 comprising a bicycle sprocket 212 in accordance with a second embodiment will be described below referring to FIGS. 11 to 14. The bicycle crank assembly 210 has the same configuration as the bicycle crank assembly 10 except for the first teeth 26. Thus, elements having substantially the same function as those in the first embodiment will be numbered the same here, and will not be described and/or illustrated again in detail here for the sake of brevity.

Figure 11:
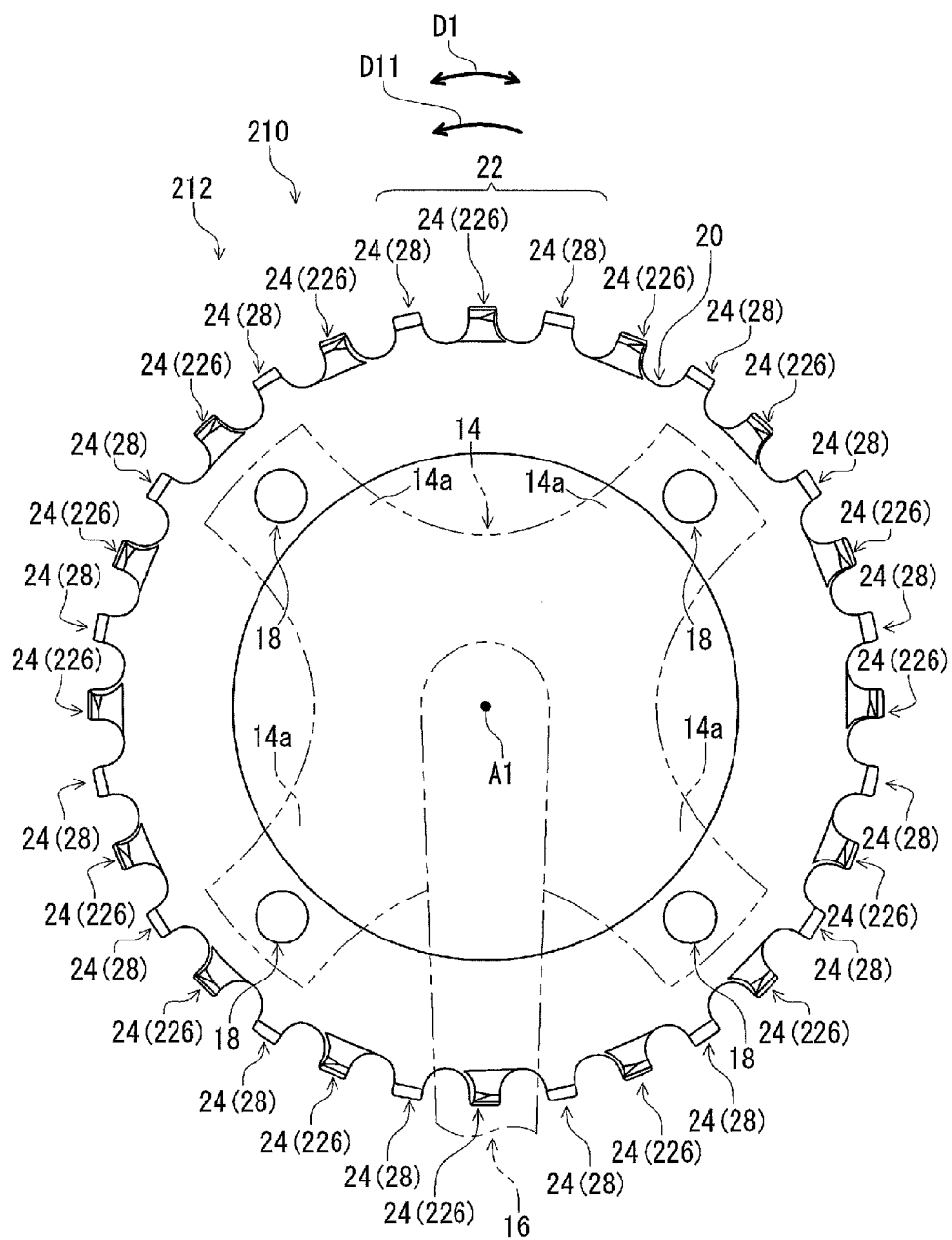
FIG. 11 is an elevational view of a bicycle crank assembly including a bicycle sprocket in accordance with a second embodiment.

As seen in FIG. 11, in the bicycle sprocket 212, the plurality of sprocket teeth 24 include at least one first tooth 226 and at least one second tooth 28. The at least one first tooth 226 includes a plurality of first teeth 226. The at least one second tooth 28 includes a plurality of second teeth 28.

Figure 12:
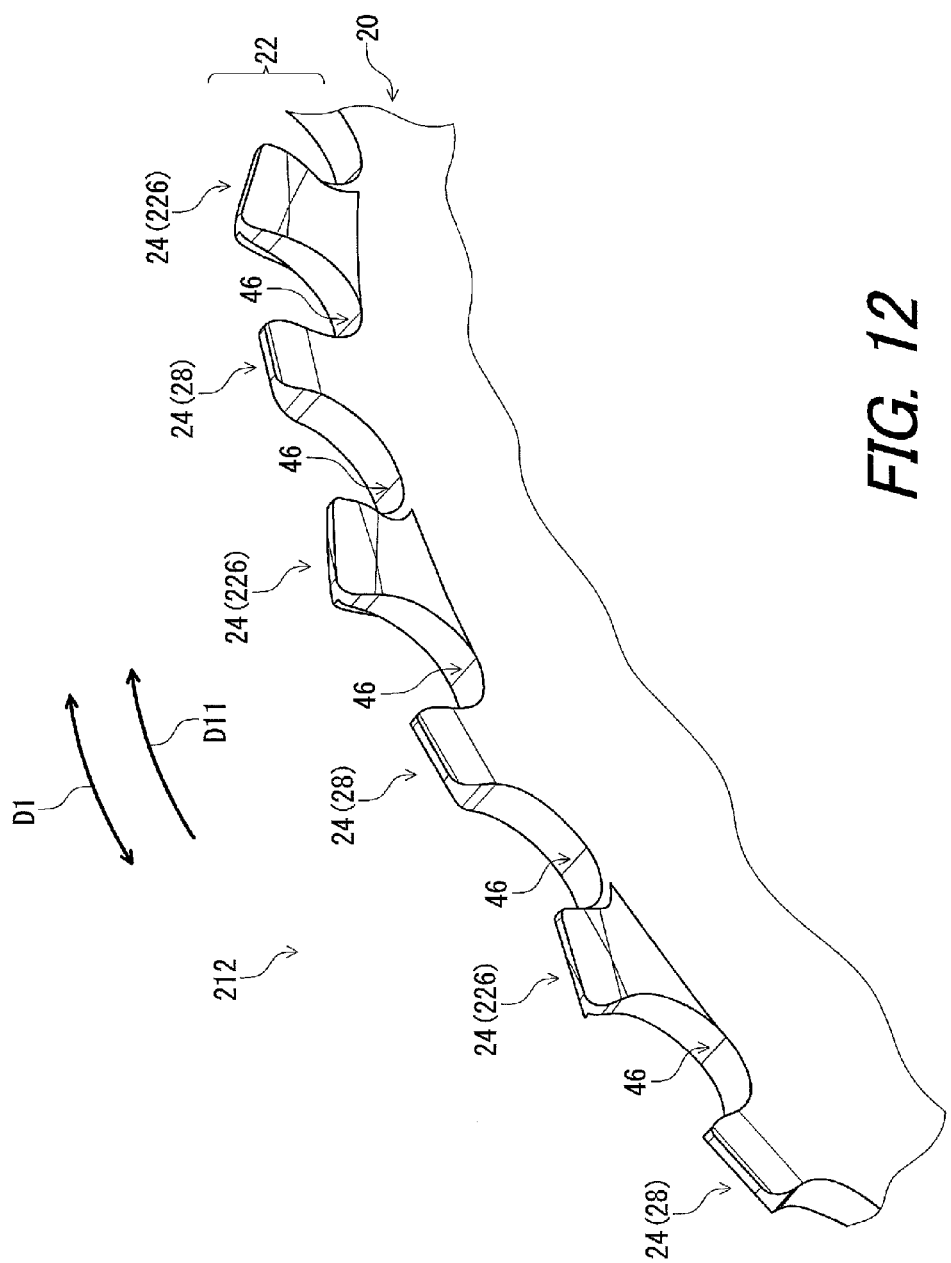
FIG. 12 is a perspective view of the bicycle sprocket illustrated in FIG. 11.
Figure 13:
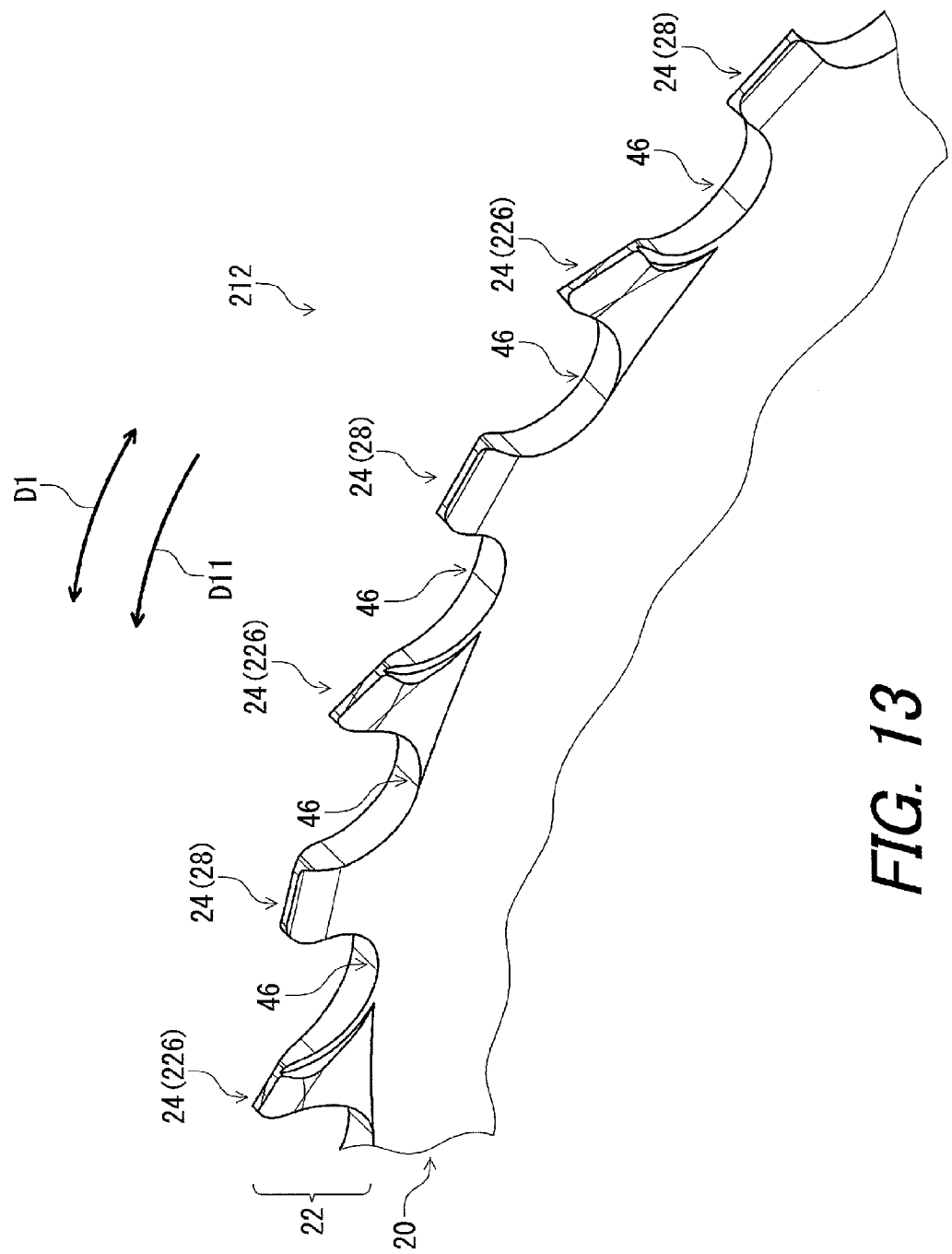
FIG. 13 is a perspective view of the bicycle sprocket illustrated in FIG. 11.

As seen in FIGS. 12 and 13, the first teeth 226 has substantially the same shape as that of the first teeth 26 in accordance with the first embodiment. However, the first teeth 226 has a shape twisted in an opposite direction relative to the first teeth 26 in accordance with the first embodiment.

Figure 14:
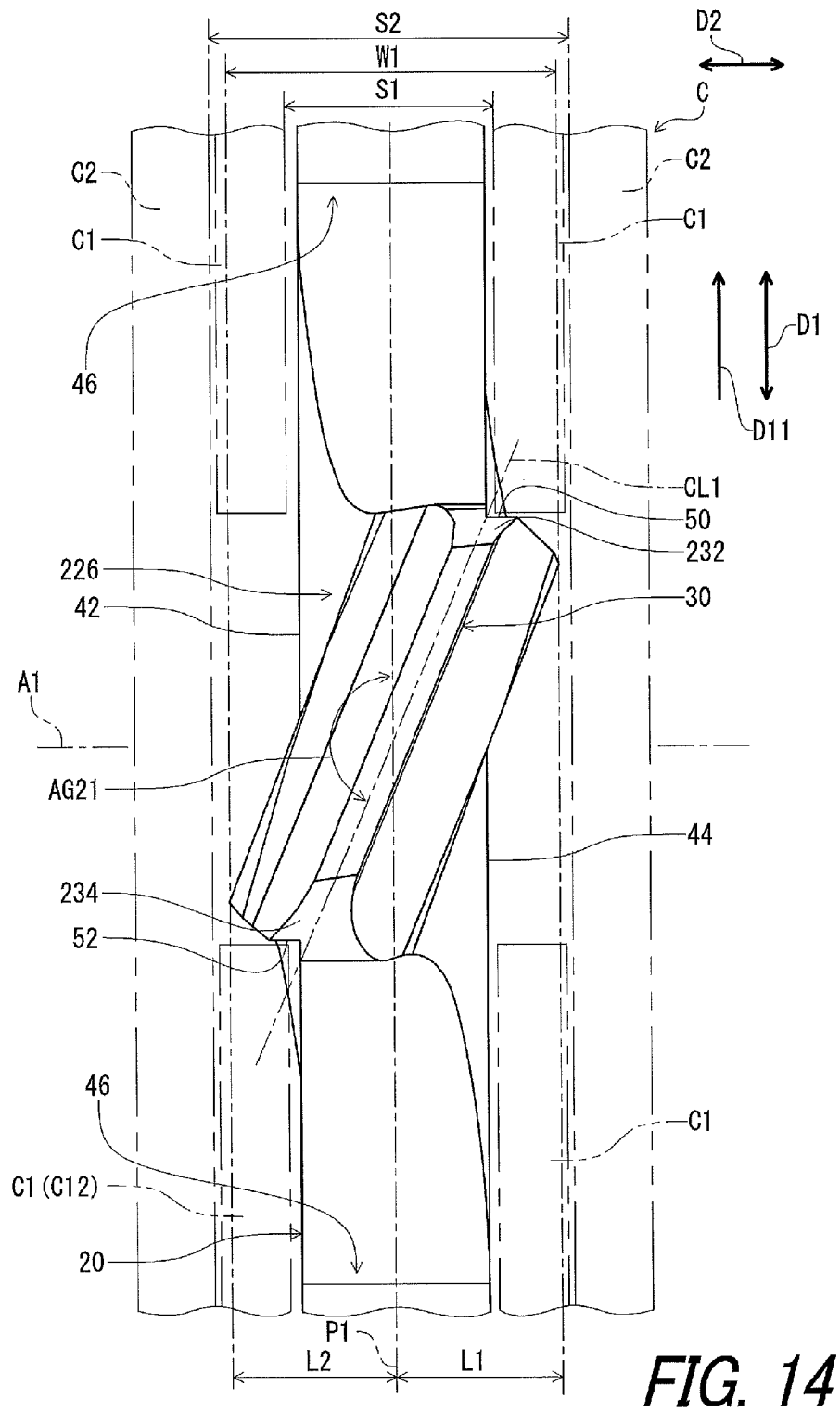
FIG. 14 is a partial plan view of a first tooth of the bicycle sprocket illustrated in FIG. 11 when viewed from a radial direction of the bicycle sprocket.

As seen in FIG. 14, the first tooth 226 has such a shape that the first tooth 26 (FIG. 4) is inverted relative to the sprocket-plane P1. For example, the first leading edge 232 is positioned closer to the second side 44 than the first trailing edge 234 in the axial direction D2. The first trailing edge 234 is positioned closer to the first side 42 than the first leading edge 232.

The first trailing edge 234 at least partly protrudes from the tooth bottom 46 in the axial direction D2 in one of the first side 42 and the second side 44. Specifically, the first trailing edge 234 partly protrudes from the tooth bottom 46 in the axial direction D2 in the first side 42. The first leading edge 232 at least partly protrudes from the tooth bottom 46 in the axial direction D2 in the other of the first side 42 and the second side 44. In the illustrated embodiment, the first leading edge 232 partly protrudes from the tooth bottom 46 in the axial direction D2 in the second side 44. However, the first leading edge 232 can entirely protrude from the tooth bottom 46 in the axial direction D2 in the second side 44 if needed and/or desired. Furthermore, the first trailing edge 234 can entirely protrude from the tooth bottom 46 in the axial direction D2 in the first side 42 if needed and/or desired.

A first inclination angle AG21 is defined between the first straight center-line CL1 and the center sprocket-plane P1 on a downstream side of the driving-rotational direction D11. The first inclination angle AG21 is defined at a position closer to the first side 42 than to the second side 44. In the illustrated embodiment, the first inclination angle AG21 is an obtuse angle. The first inclination angle AG21 is larger than the first inclination angle AG1 (FIG. 4).

With the bicycle sprocket 212, it is possible to obtain substantially the same advantageous effects as those of the bicycle sprocket 12 in accordance with the first embodiment.

Third Embodiment

A bicycle crank assembly 310 comprising a bicycle sprocket 312 in accordance with a third embodiment will be described below referring to FIGS. 15 and 16. The bicycle crank assembly 310 has the same configuration as the bicycle crank assembly 10 except for the first teeth 26. Thus, elements having substantially the same function as those in the above embodiments will be numbered the same here, and will not be described and/or illustrated again in detail here for the sake of brevity.

Figure 15:
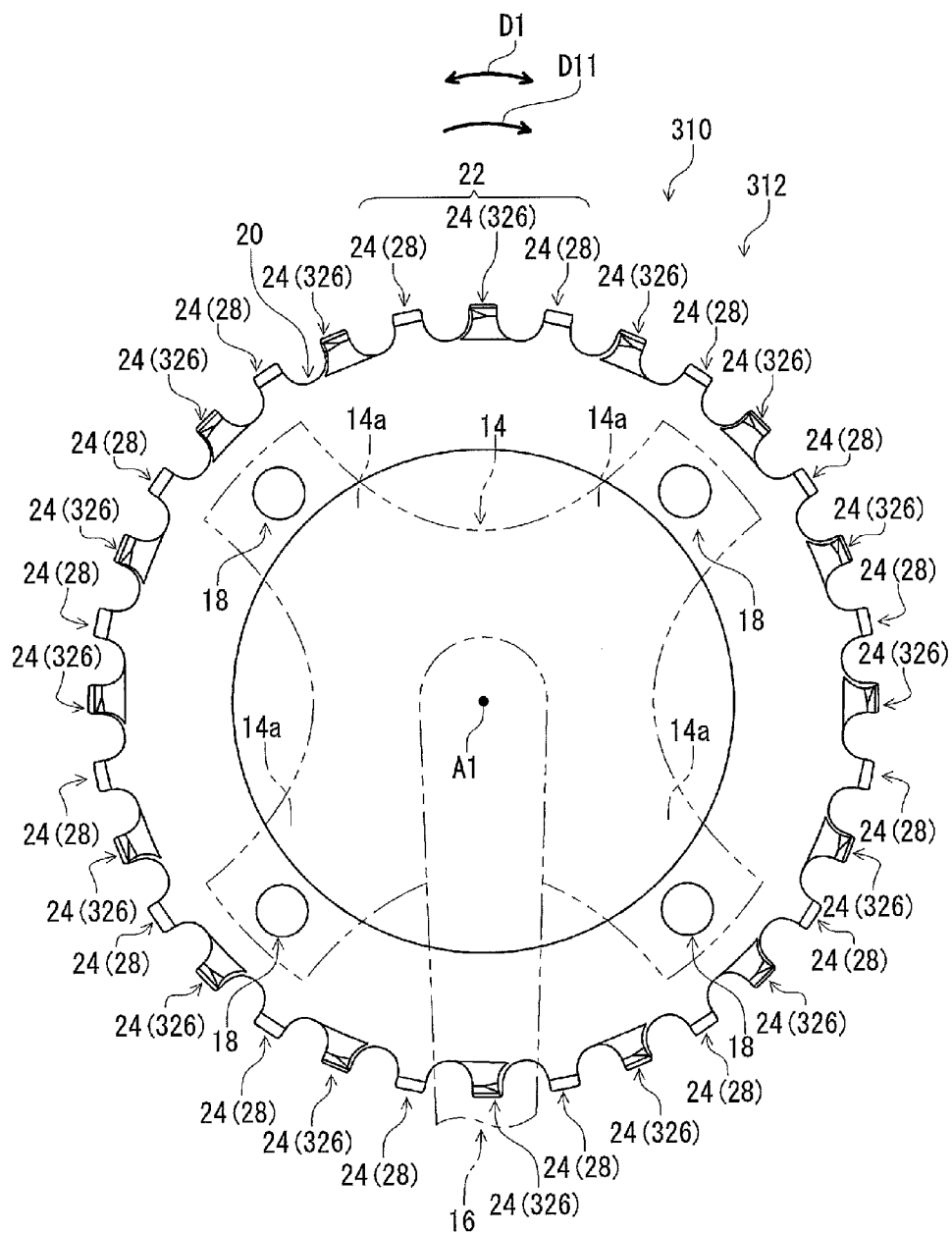
FIG. 15 is an elevational view of a bicycle crank assembly including a bicycle sprocket in accordance with a third embodiment.

As seen in FIG. 15, in the bicycle sprocket 312, the plurality of sprocket teeth 24 include at least one first tooth 326 and at least one second tooth 28. The at least one first tooth 326 includes a plurality of first teeth 326. The first teeth 326 has substantially the same shape as that of the first teeth 26 in accordance with the first embodiment.

Figure 16:
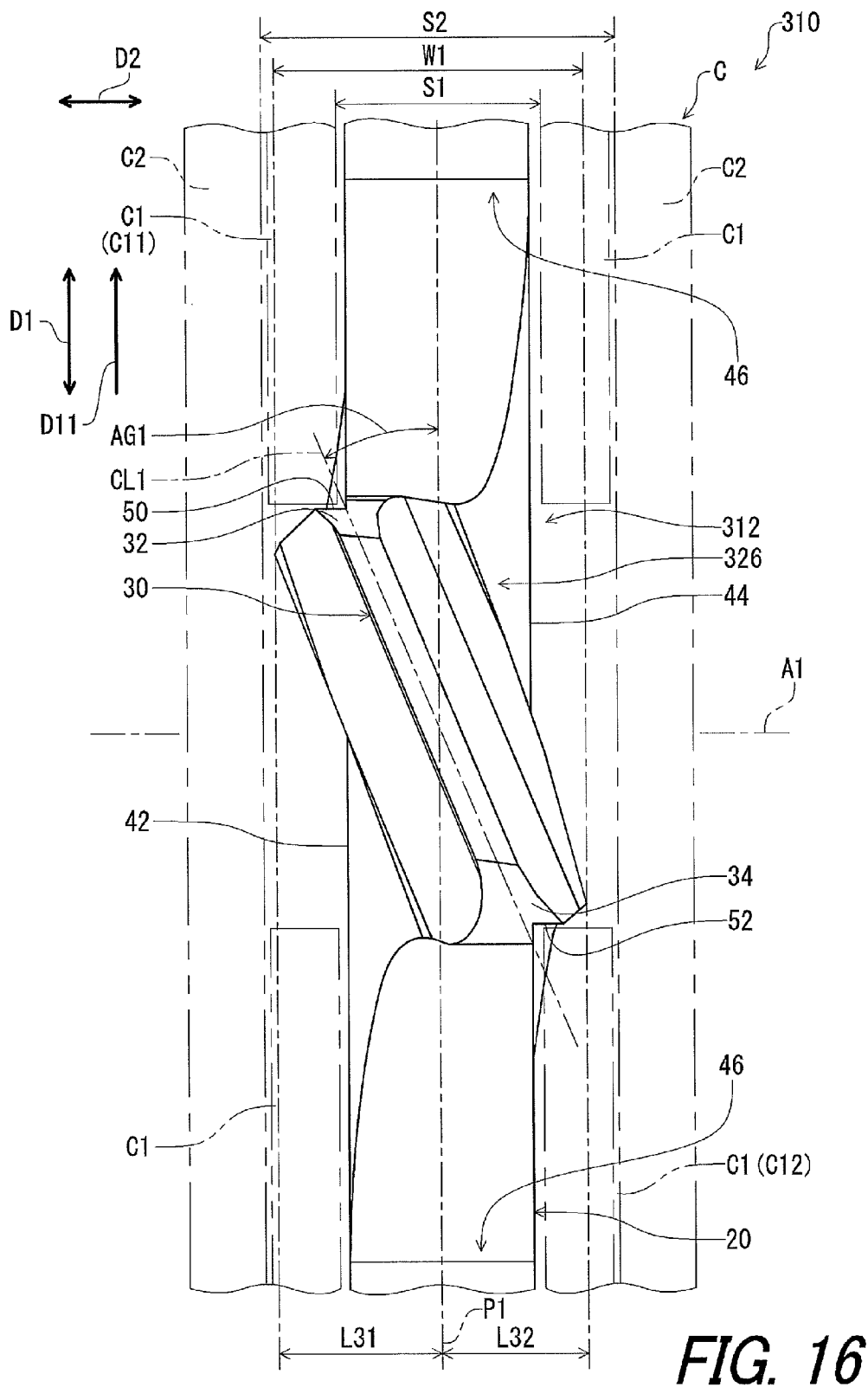
FIG. 16 is a partial plan view of a first tooth of the bicycle sprocket illustrated in FIG. 15 when viewed from a radial direction of the bicycle sprocket.
Figure 17:
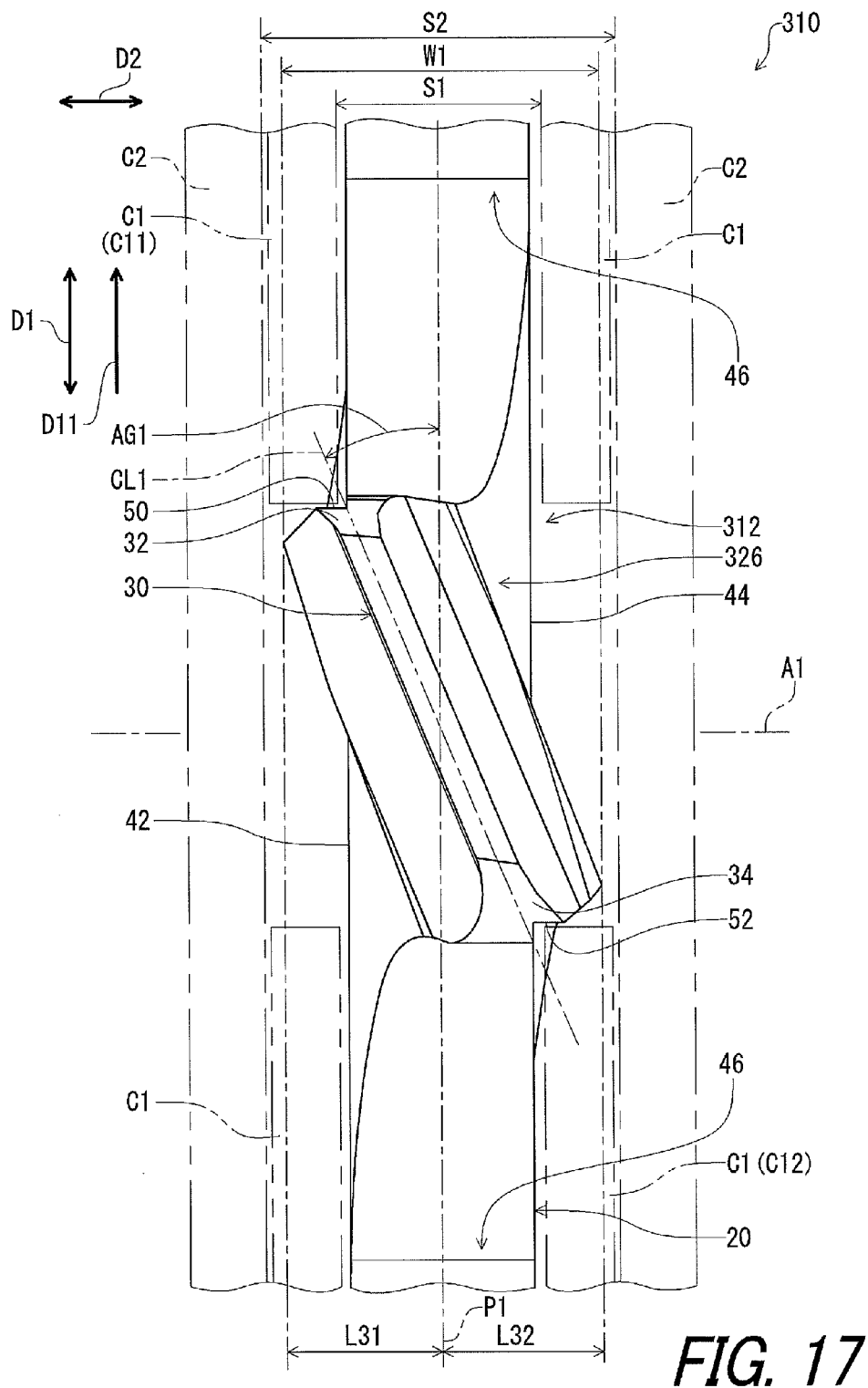
FIG. 17 is a partial plan view of a first tooth of the bicycle sprocket illustrated in FIG. 15 when viewed from a radial direction of the bicycle sprocket (modified embodiment)

As seen in FIG. 16, however, a first maximum leading distance L31 defined between the first leading edge 32 and the center sprocket-plane P1 in the axial direction D2 is different from a first maximum trailing distance L32 defined between the first trailing edge 34 and the center sprocket-plane P1 in the axial direction D2. In the illustrated embodiment, the first maximum leading distance L31 is larger than the first maximum trailing distance L32. As seen in FIG. 17, however, the first maximum leading distance L31 can be smaller than the first maximum trailing distance L32 if needed and/or desired.

With the bicycle sprocket 312, it is possible to obtain substantially the same advantageous effects as those of the bicycle sprocket 12 in accordance with the first embodiment.

Fourth Embodiment

A bicycle crank assembly 410 comprising a bicycle sprocket 412 in accordance with a fourth embodiment will be described below referring to FIG. 18. The bicycle crank assembly 410 has the same configuration as the bicycle crank assembly 10 except for the first teeth 26. Thus, elements having substantially the same function as those in the above embodiments will be numbered the same here, and will not be described and/or illustrated again in detail here for the sake of brevity.

Figure 18:
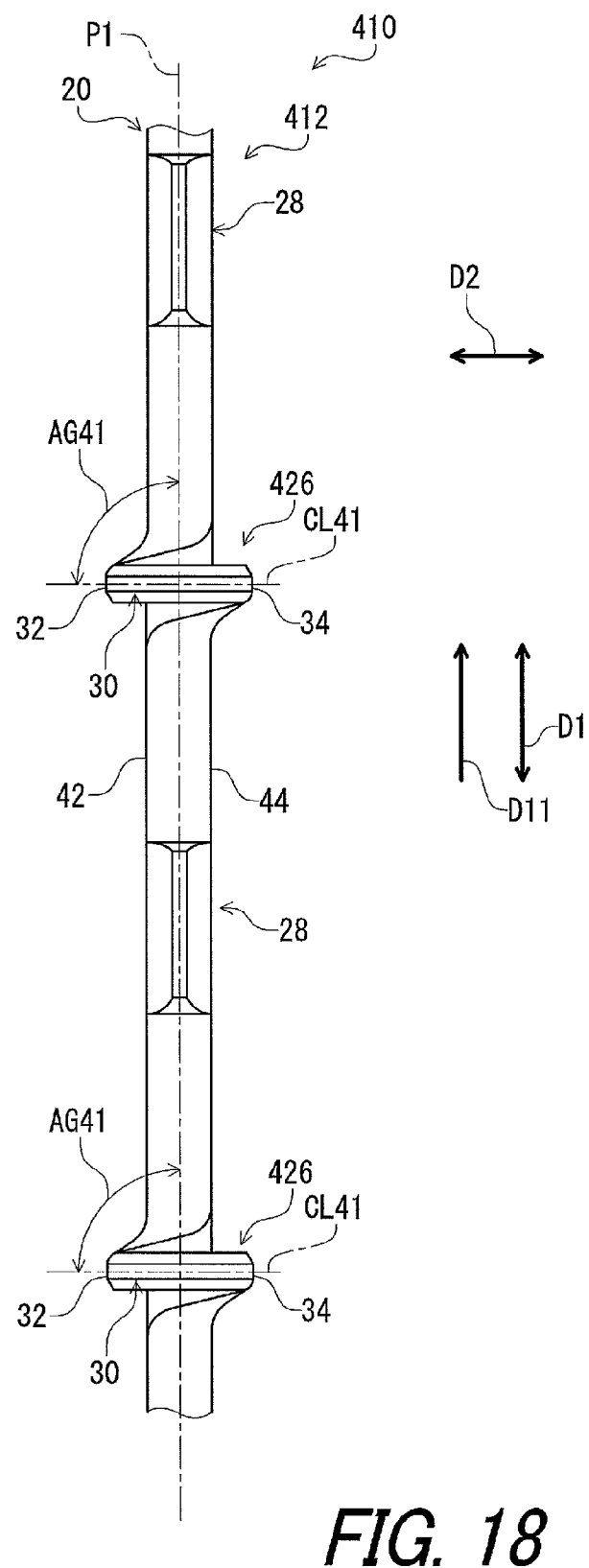
FIG. 18 is a partial plan view of a bicycle sprocket in accordance with a fourth embodiment when viewed from a radial direction of the bicycle sprocket.

As seen in FIG. 18, in the bicycle sprocket 410, the plurality of sprocket teeth 24 include at least one first tooth 426 and at least one second tooth 28. The at least one first tooth 426 includes a plurality of first teeth 426. A first straight center-line CL41 of the first tooth top 30 of the first tooth 426 is perpendicular to the sprocket-plane P1. In other words, the first tooth top 30 extends perpendicularly to the sprocket plane P1 and extends in the axial direction with respect to the rotational center axis A1. The first inclination angle AG41 is approximately 90 degrees.

With the bicycle sprocket 412, it is possible to obtain substantially the same advantageous effects as those of the bicycle sprocket 12 in accordance with the first embodiment.

Fifth Embodiment

A bicycle crank assembly 510 comprising a bicycle sprocket 512 in accordance with a fifth embodiment will be described below referring to FIGS. 19 and 20. The bicycle crank assembly 510 has the same configuration as the bicycle crank assembly 10 except for the first teeth 26. Thus, elements having substantially the same function as those in the above embodiments will be numbered the same here, and will not be described and/or illustrated again in detail here for the sake of brevity.

Figure 19:
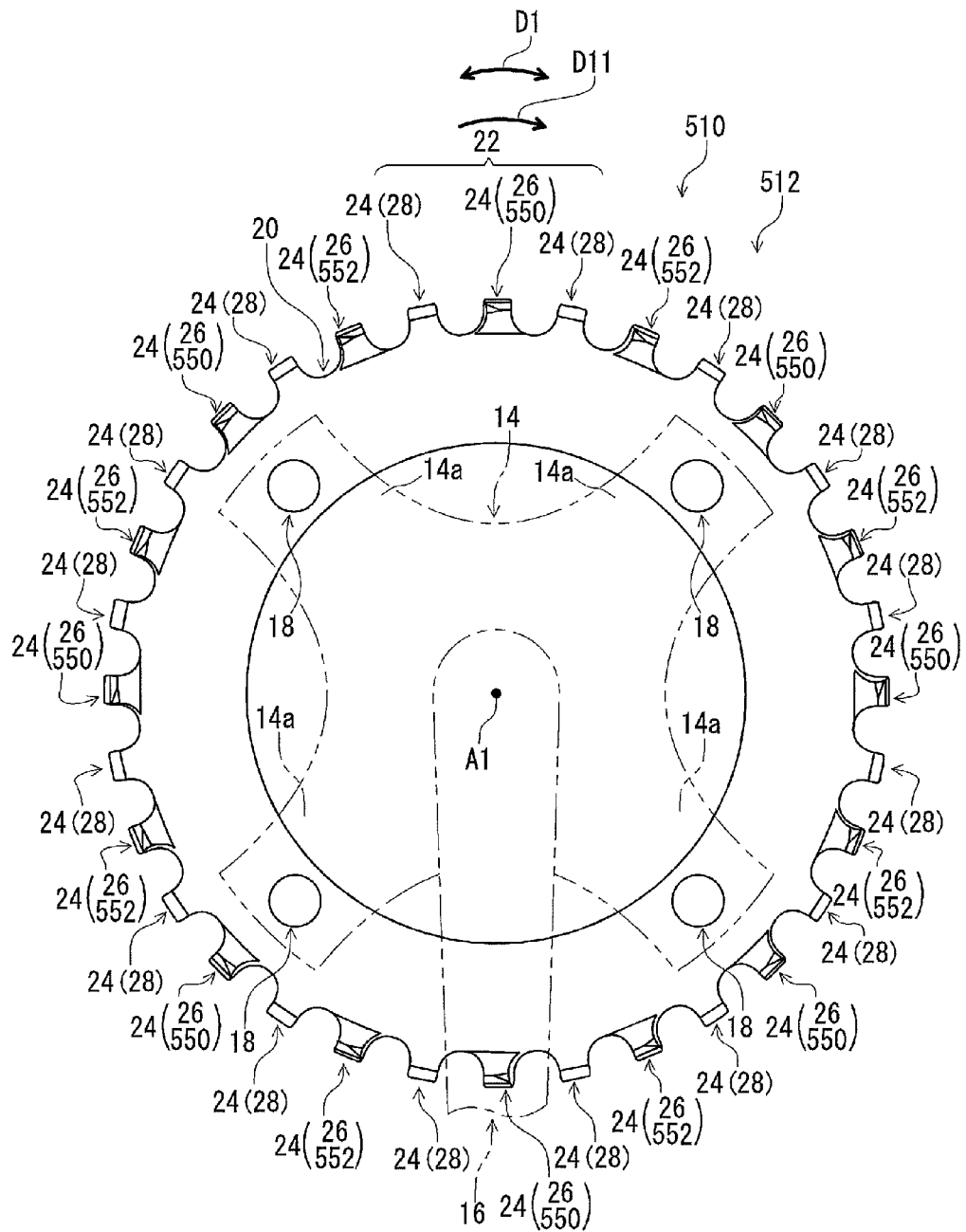
FIG. 19 is an elevational view of a bicycle crank assembly including a bicycle sprocket in accordance with a fourth embodiment.

As seen in FIG. 19, in the bicycle sprocket 512, the plurality of first teeth 26 includes at least one third tooth 550 and at least one fourth tooth 552. The plurality of first teeth 26 includes a plurality of third teeth 550 and a plurality of fourth teeth 552. The third teeth 550 and the fourth teeth 552 are arranged alternatingly in the circumferential direction D1.

Figure 20:
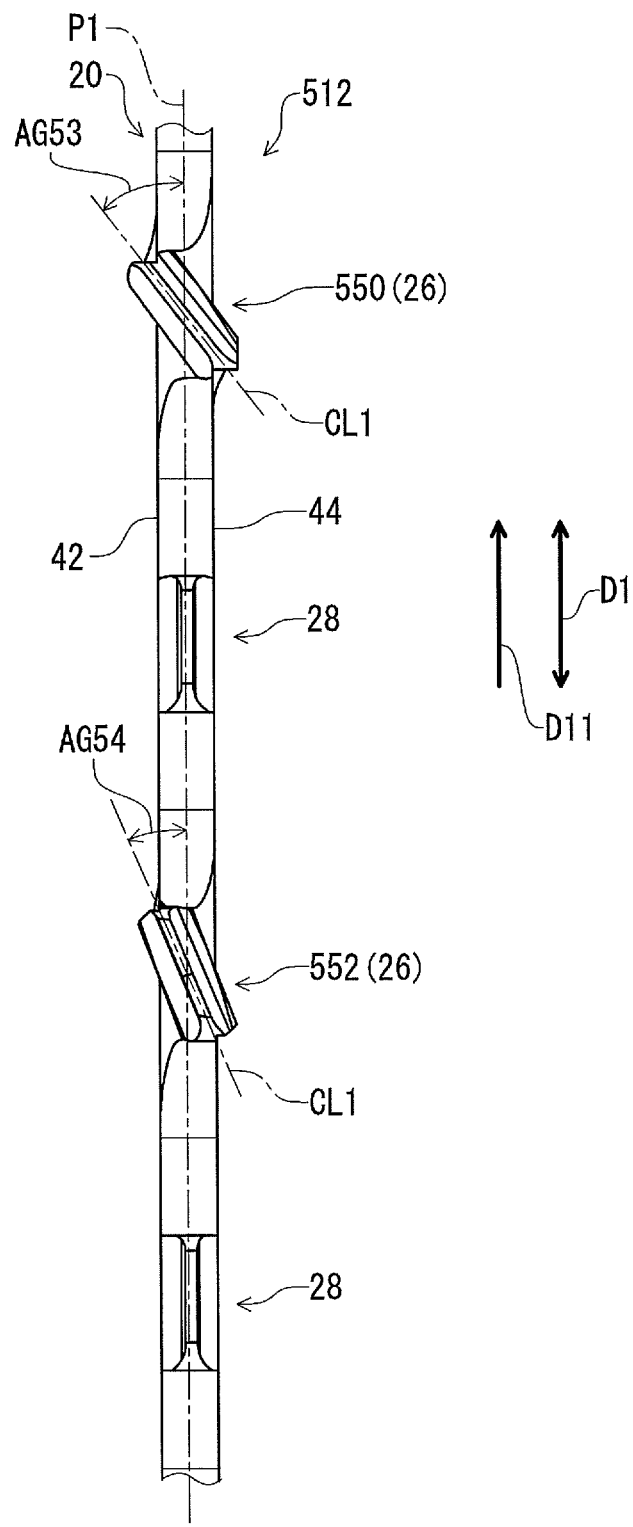
FIG. 20 is a partial plan view of a bicycle sprocket in accordance with a fifth embodiment when viewed from a radial direction of the bicycle sprocket.

As seen in FIG. 20, a third inclination angle AG53 is defined between the first straight center-line CL1 of the at least one third tooth 550 and the center sprocket-plane P1 on a downstream side of the driving-rotational direction D11 and is defined at a position closer to the first side 42 than to the second side 44. A fourth inclination angle AG54 is defined between the first straight center-line CL1 of the at least one fourth tooth 552 and the center sprocket-plane P1 on the downstream side of the driving-rotational direction D11 and is defined at a position closer to the first side 42 than to the second side 44. The third inclination angle AG53 is different from the fourth inclination angle AG54. For example, the third inclination angle AG53 is larger than the fourth inclination angle AG54. However, the third inclination angle AG53 can be smaller than the fourth inclination angle AG54 if needed and/or desired.

With the bicycle sprocket 512, it is possible to obtain substantially the same advantageous effects as those of the bicycle sprocket 12 in accordance with the first embodiment.

Sixth Embodiment

A bicycle crank assembly 610 comprising a bicycle sprocket 612 in accordance with a sixth embodiment will be described below referring to FIGS. 21 and 22. The bicycle crank assembly 610 has the same configuration as the bicycle crank assembly 10 except for the second teeth 28. Thus, elements having substantially the same function as those in the above embodiments will be numbered the same here, and will not be described and/or illustrated again in detail here for the sake of brevity.

Figure 21:
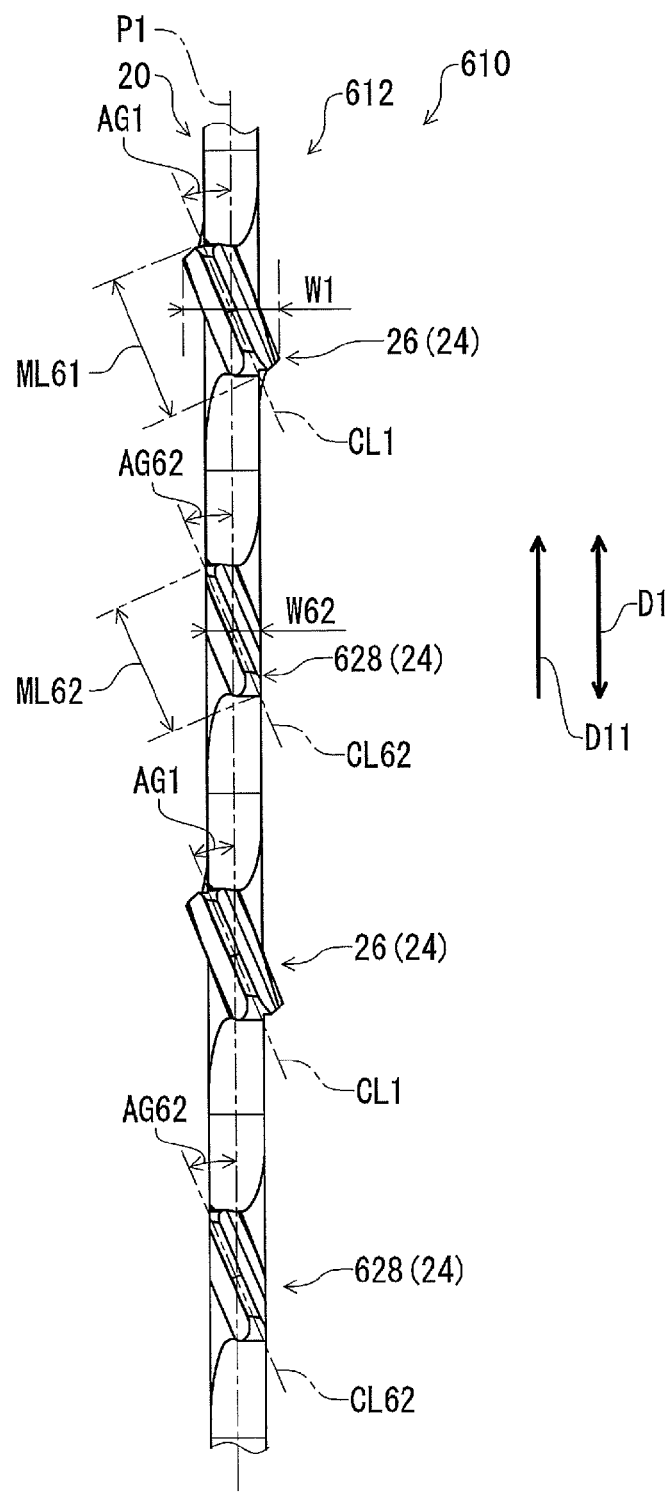
FIG. 21 is a partial plan view of a bicycle sprocket in accordance with a sixth embodiment when viewed from a radial direction of the bicycle sprocket.

As seen in FIG. 21, in the bicycle sprocket 612, the plurality of sprocket teeth 24 include at least one first tooth 26 and at least one second tooth 628. The at least one first tooth 26 is adjacent to the at least one second tooth 628 without a tooth positioned therebetween. In the illustrated embodiment, the at least one second tooth 628 includes a plurality of second teeth 628.

Figure 22:
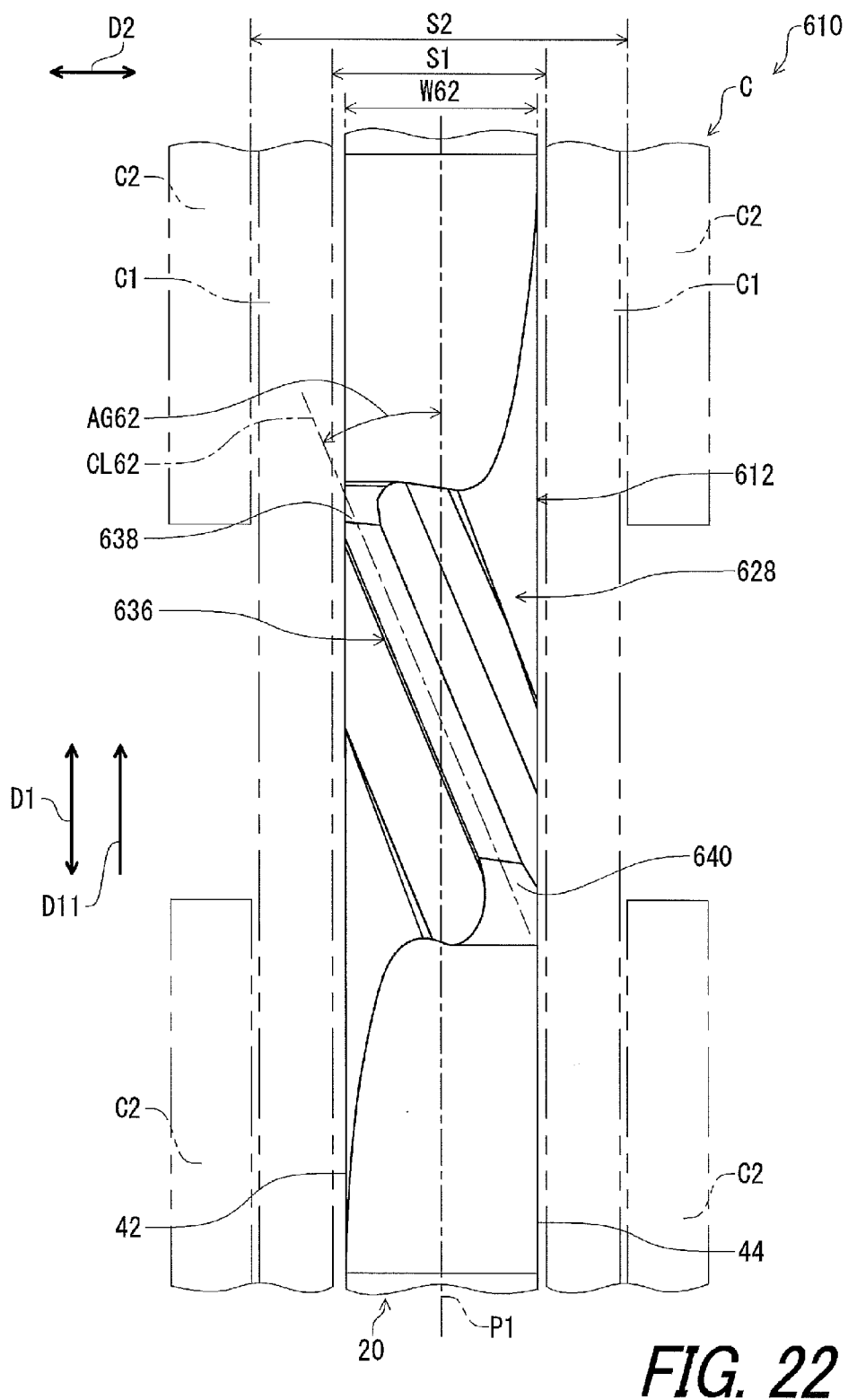
FIG. 22 is a partial plan view of a second tooth of a bicycle sprocket illustrated in FIG. 21 when viewed from a radial direction of the bicycle sprocket.

As seen in FIG. 22, the plurality of the second teeth 628 each has a second tooth top 636 with a second leading edge 638 and a second trailing edge 640. The second leading edge 638 is positioned downstream from the second trailing edge 640 with respect to the driving-rotational direction D11. A second straight center-line CL62 is defined to connect the second leading edge 638 with the second trailing edge 640 and is non-parallel to the sprocket-plane P1. The second straight center-line CL62 inclines with respect to the sprocket-plane P1.

A second inclination angle AG62 is defined between the second straight center-line CL62 and the center sprocket-plane P1 on the downstream side of the driving-rotational direction D11 and is defined at a position closer to the first side 42 than to the second side 44. In the illustrated embodiment, the second inclination angle AG62 is equal to the first inclination angle AG1 (FIG. 4). However, the second inclination angle AG62 can be different from the first inclination angle AG1 if needed and/or desired. As seen in FIGS. 21 and 22, a maximum longitudinal length ML62 of the second tooth top 636 is smaller than a maximum longitudinal length ML61 of the first tooth top 30 when viewed from a radial direction of the bicycle sprocket 612 so that the second teeth 628 each have a second axial chain-engagement width W62 that is smaller than the first axial chain-engagement width W1 and so that the second chain-engagement width W62 is smaller than the inner link space S1 defined between the pair of inner link plates C1 of the bicycle chain C whereas the first chain-engagement width W1 is larger than the inner link space S1 and smaller than the outer link space S2 defined between the pair of outer link plates C2 of the bicycle chain C.

With the bicycle sprocket 612, it is possible to obtain substantially the same advantageous effects as those of the bicycle sprocket 12 in accordance with the first embodiment.

Seventh Embodiment

A bicycle crank assembly 710 comprising a bicycle sprocket 712 in accordance with a seventh embodiment will be described below referring to FIG. 23. The bicycle crank assembly 710 has the same configuration as the bicycle crank assembly 10 except for the first side 42 and the second side 44. Thus, elements having substantially the same function as those in the above embodiments will be numbered the same here, and will not be described and/or illustrated again in detail here for the sake of brevity.

Figure 23:
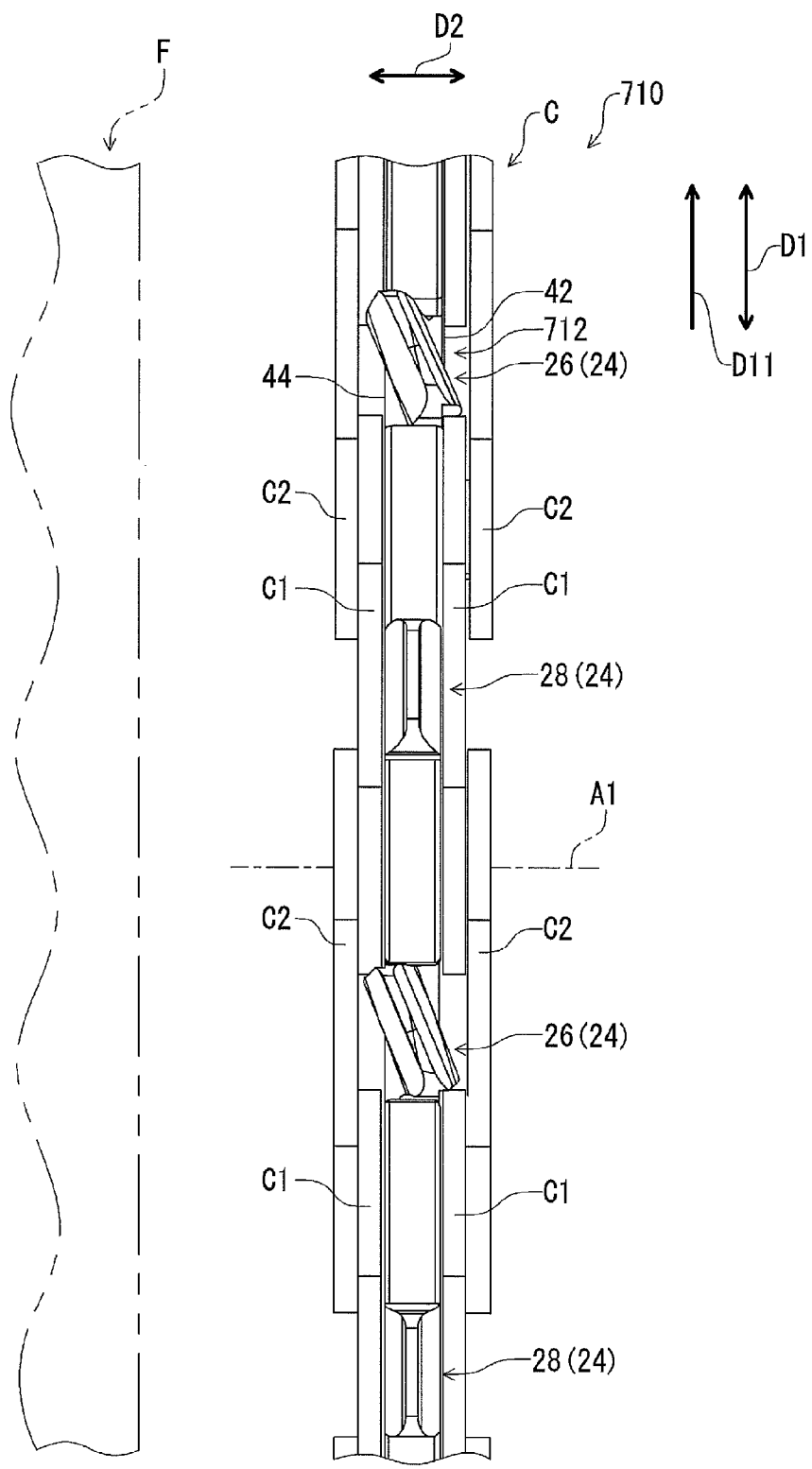
FIG. 23 is a partial plan view of a bicycle sprocket in accordance with a seventh embodiment when viewed from a radial direction of the bicycle sprocket.

As seen in FIG. 23, in the bicycle sprocket 712, the second side 44 is closer to the bicycle frame F than the first side 42 in the axial direction D2 in the state where the bicycle sprocket 12 is mounted to the bicycle frame F.

With the bicycle sprocket 712, it is possible to obtain substantially the same advantageous effects as those of the bicycle sprocket 12 in accordance with the first embodiment.

Figure 24:
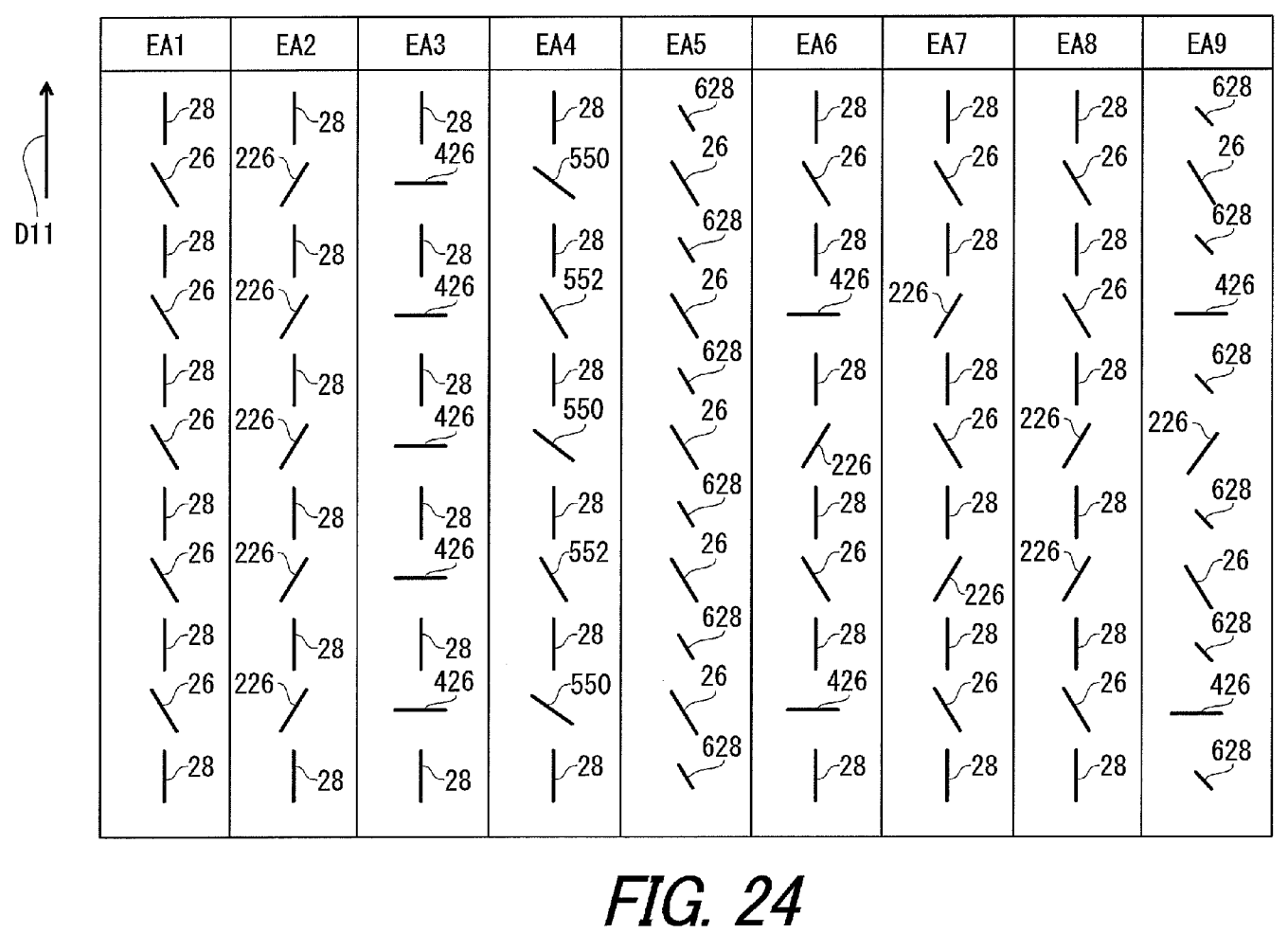

It will be apparent to those skilled in the bicycle field from the present disclosure that the constructions in accordance with the above embodiments can be at least partly combined with each other. FIG. 24 shows exemplary arrangements of the first and second teeth. In FIG. 24, the bold lines indicate the first tooth top and the second tooth top. The exemplary arrangement EA1 corresponds to the first and third embodiments. The exemplary arrangement EA2 corresponds to the second embodiment. The exemplary arrangement EA3 corresponds to the fourth embodiment. The exemplary arrangement EA4 corresponds to the fifth embodiment. The exemplary arrangement EA5 corresponds to the sixth embodiment. Each of the exemplary arrangements EA6 to EA9 corresponds to a combination of at least two constructions of the above embodiments.

In the present application, the term "attached" or "attaching", as used herein, can encompass configurations in which an element is directly attached to the other element by affixing the element directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
a sprocket body having a rotational center axis, a first side and a second side opposite to the first side in an axial direction parallel to the rotational center axis; and
a chain engagement structure disposed on an outer periphery of the sprocket body, the chain engagement structure including a plurality of sprocket teeth extending radially outward from the outer periphery of the sprocket body, the plurality of sprocket teeth including at least one first tooth and at least one second tooth, the at least one first tooth having a first tooth top extending non-parallel to a sprocket-plane perpendicular to the rotational center axis when viewed from a radial direction of the bicycle sprocket, the at least one first tooth having a first axial chain-engagement width that is larger than an inner link space defined between a pair of inner link plates of a bicycle chain and smaller than an outer link space defined between a pair of outer link plates of the bicycle chain, the at least one second tooth having a second axial chain-engagement width that is smaller than the inner link space, wherein the at least one first tooth is adjacent to the at least one second tooth without a tooth positioned therebetween.

2. The bicycle sprocket according to claim 1, wherein
the at least one first tooth including a plurality of first teeth, and
the at least one second tooth including a plurality of second teeth.

3. The bicycle sprocket according to claim 2, wherein
the plurality of the second teeth each has a second tooth top extending parallel to the sprocket-plane.

4. The bicycle sprocket according to claim 1, wherein
a total number of the plurality of sprocket teeth is an even number.

5. The bicycle sprocket according to claim 1, wherein
a total number of the at least one first tooth is equal to a total number of the at least one second tooth.

6. The bicycle sprocket according to claim 1, wherein
the first tooth top inclines with respect to the sprocket-plane.

7. The bicycle sprocket according to claim 1, wherein
the first tooth top has a first leading edge and a first trailing edge,
the first leading edge is positioned downstream with respect to the first trailing edge in a driving-rotational direction of the bicycle sprocket, and
a first straight center-line is defined to connect the first leading edge with the first trailing edge and is non-parallel to the sprocket-plane.

8. The bicycle sprocket according to claim 7, wherein
the sprocket-plane is a center sprocket-plane defined to bisect the bicycle sprocket.

9. The bicycle sprocket according to claim 8, wherein
a first maximum leading distance defined between the first leading edge and the center sprocket-plane in the axial direction is equal to a first maximum trailing distance defined between the first trailing edge and the center sprocket-plane in the axial direction.

10. The bicycle sprocket according to claim 8, wherein a first maximum leading distance defined between the first leading edge and the center sprocket-plane in the axial direction is different from a first maximum trailing distance defined between the first trailing edge and the center sprocket-plane in the axial direction.

11. The bicycle sprocket according to claim 10, wherein the first maximum leading distance is larger than the first maximum trailing distance.

12. The bicycle sprocket according to claim 10, wherein the first maximum leading distance is smaller than the first maximum trailing distance.

13. The bicycle sprocket according to claim 8, wherein the at least one first tooth including a plurality of first teeth,
the plurality of first teeth includes at least one third tooth and at least one fourth tooth,
a third inclination angle is defined between the first straight center-line of the at least one third tooth and the center sprocket-plane on a downstream side of the driving-rotational direction and is defined at a position closer to the first side than to the second side,
a fourth inclination angle is defined between the first straight center-line of the at least one fourth tooth and the center sprocket-plane on the downstream side of the driving-rotational direction and is defined at a position closer to the first side than to the second side, and
the third inclination angle is different from the fourth inclination angle.

14. The bicycle sprocket according to claim 7, wherein the at least one second tooth includes a plurality of second teeth,
the plurality of the second teeth each has a second tooth top,
the second tooth top includes a second leading edge and a second trailing edge,
the second leading edge is positioned downstream from the second trailing edge with respect to the driving-rotational direction, and
a second straight center-line is defined to connect the second leading edge with the second trailing edge and is parallel to the center sprocket-plane.

15. The bicycle sprocket according to claim 7, wherein the first leading edge is positioned closer to the first side than the first trailing edge in the axial direction, and
the first trailing edge is positioned closer to the second side than the first leading edge.

16. The bicycle sprocket according to claim 7, wherein the first leading edge is positioned closer to the second side than the first trailing edge in the axial direction, and
the first trailing edge is positioned closer to the first side than the first leading edge.

17. The bicycle sprocket according to claim 7, wherein the first leading edge at least partly protrudes from a tooth bottom in the axial direction in one of the first side and the second side.

18. The bicycle sprocket according to claim 17, wherein the first trailing edge at least partly protrudes from the tooth bottom in the axial direction in the other of the first side and the second side.

19. The bicycle sprocket according to claim 7, wherein the first trailing edge at least partly protrudes from the tooth bottom in the axial direction in the other of the first side and the second side.

20. The bicycle sprocket according to claim 7, wherein the first straight center-line inclines with respect to the sprocket-plane.

21. The bicycle sprocket according to claim 7, wherein the first straight center-line is perpendicular to the sprocket-plane.

22. The bicycle sprocket according to claim 7, wherein the at least one second tooth includes a plurality of second teeth,
the plurality of the second teeth each has a second tooth top,
the second tooth top includes a second leading edge and a second trailing edge,
the second leading edge is positioned downstream from the second trailing edge with respect to the driving-rotational direction, and
a second straight center-line is defined to connect the second leading edge with the second trailing edge and is non-parallel to the sprocket-plane.

23. The bicycle sprocket according to claim 22, wherein the second straight center-line inclines with respect to the sprocket-plane.

24. The bicycle sprocket according to claim 23, wherein the sprocket-plane is a center sprocket-plane defined to bisect the bicycle sprocket,
a first inclination angle is defined between the first straight center-line and the center sprocket-plane on a downstream side of the driving-rotational direction and is defined at a position closer to the first side than to the second side,
a second inclination angle is defined between the second straight center-line and the center sprocket-plane on the downstream side of the driving-rotational direction and is defined at a position closer to the first side than to the second side, and
the second inclination angle is smaller than the first inclination angle.

25. The bicycle sprocket according to claim 23, wherein the sprocket-plane is a center sprocket-plane defined to bisect the bicycle sprocket,
a first inclination angle is defined between the first straight center-line and the center sprocket-plane on a downstream side of the driving-rotational direction and is defined at a position closer to the first side than to the second side,
a second inclination angle is defined between the second straight center-line and the center sprocket-plane on the downstream side of the driving-rotational direction and is defined at a position closer to the first side than to the second side,
the second inclination angle is equal to the first inclination angle, and
a maximum longitudinal length of the second tooth top is smaller than a maximum longitudinal length of the first tooth top when viewed from a radial direction of the bicycle sprocket.

26. The bicycle sprocket according to claim 1, wherein the at least one second tooth has a second tooth top extending parallel to the sprocket-plane.

27. The bicycle sprocket according to claim 1, wherein the first side is closer to a bicycle frame than the second side in the axial direction in a state where the bicycle sprocket is mounted to the bicycle frame.

28. The bicycle sprocket according to claim 1, wherein the second side is closer to a bicycle frame than the first side in the axial direction in a state where the bicycle sprocket is mounted to the bicycle frame.

29. The bicycle sprocket according to claim 1, further comprising:
a crank arm attachment portion.

30. A bicycle crank assembly comprising:
the bicycle sprocket according to claim 1.

31. The bicycle crank assembly according to claim 30, wherein
the bicycle sprocket is a single sprocket for the bicycle crank assembly.

32. A bicycle sprocket comprising: a sprocket body having a rotational center axis, a first side and a second side opposite to the first side in an axial direction parallel to the rotational center axis; and a chain engagement structure disposed on an outer periphery of the sprocket body, the chain engagement structure including a plurality of sprocket teeth extending radially outward from the outer periphery of the sprocket body, the plurality of sprocket teeth including at least one first tooth and at least one second tooth, the at least one first tooth having a first tooth top extending non-parallel to a sprocket-plane perpendicular to the rotational center axis when viewed from a radial direction of the bicycle sprocket, the at least one first tooth having a first axial chain-engagement width that is larger than an inner link space defined between a pair of inner link plates of a bicycle chain and smaller than an outer link space defined between a pair of outer link plates of the bicycle chain, the at least one second tooth having a second axial chain-engagement width that is smaller than the inner link space, wherein the at least one first tooth including a plurality of first teeth, the at least one second tooth including a plurality of second teeth, and the plurality of second teeth are arranged alternately between the plurality of first teeth.

33. A bicycle sprocket comprising: a sprocket body having a rotational center axis, a first side and a second side opposite to the first side in an axial direction parallel to the rotational center axis; and a chain engagement structure disposed on an outer periphery of the sprocket body, the chain engagement structure including a plurality of sprocket teeth extending radially outward from the outer periphery of the sprocket body, the plurality of sprocket teeth including at least one first tooth and at least one second tooth, the at least one first tooth having a first tooth top extending non-parallel to a sprocket-plane perpendicular to the rotational center axis when viewed from a radial direction of the bicycle sprocket, the at least one first tooth having a first axial chain-engagement width that is larger than an inner link space defined between a pair of inner link plates of a bicycle chain and smaller than an outer link space defined between a pair of outer link plates of the bicycle chain, the at least one second tooth having a second axial chain-engagement width that is smaller than the inner link space, wherein the first tooth top has a first leading edge and a first trailing edge, the first leading edge is positioned downstream with respect to the first trailing edge in a driving-rotational direction of the bicycle sprocket, a first straight center-line is defined to connect the first leading edge with the first trailing edge and is non-parallel to the sprocket-plane, and
the at least one first tooth has
a leading recess to avoid an excessive contact of the at least one first tooth with an inner link plate of the bicycle chain, the leading recess being at least partly provided at the first leading edge, and
a trailing recess to avoid an excessive contact of the at least one first tooth with another inner link plate of the bicycle chain, the trailing recess being at least partly provided at the first trailing edge.

* * * * *